(12) United States Patent
Wee

(10) Patent No.: US 7,313,833 B2
(45) Date of Patent: Jan. 1, 2008

(54) VEHICLE EMERGENCY TOILET SYSTEM

(76) Inventor: Karen Wee, P.O. Box 3492, New Hyde Park, NY (US) 11040

( * ) Notice: Subject to any disclaimer, the term of this patent is extended or adjusted under 35 U.S.C. 154(b) by 0 days.

(21) Appl. No.: 11/450,492

(22) Filed: Jun. 9, 2006

(65) Prior Publication Data

US 2007/0000042 A1    Jan. 4, 2007

Related U.S. Application Data

(60) Provisional application No. 60/689,878, filed on Jun. 11, 2005.

(51) Int. Cl.
*B60R 15/04* (2006.01)
*A47K 11/04* (2006.01)
(52) U.S. Cl. .............................................. 4/458; 4/476
(58) Field of Classification Search .................... 4/449, 4/458, 476, 484
See application file for complete search history.

(56) References Cited

U.S. PATENT DOCUMENTS

| | | | |
|---|---|---|---|
| 356,654 A * | 1/1887 | Martin | 4/321 |
| 1,454,618 A * | 5/1923 | Banks | 296/24.3 |
| 4,785,483 A * | 11/1988 | Wise | 4/321 |

* cited by examiner

*Primary Examiner*—Charles E. Phillips
(74) *Attorney, Agent, or Firm*—Raymond M. Galasso; Galasso & Associates, LP

(57) ABSTRACT

Inventive disclosures made herein comprise various embodiments of a vehicle emergency toilet system having portions built into the seat of the vehicle. The toilet equipped vehicle seats having a toilet with a disposable waste receiving reservoir built into a seat portion thereof together with deployable privacy shades build into the vehicle seat back, vehicle roof or rear deck. The emergency toilet may be built into any flying mode of transportation like a helicopter, a jet plane, a military helicopter, a submarine (any submersible modes of transportation), an automobile, an ambulance, a stakeout police car or a detective car, a surveillance car, a taxi, among others.

8 Claims, 20 Drawing Sheets

VEHICLE EMERGENCY TOILET SYSTEM

CROSS REFERENCE TO RELATED APPLICATIONS

This application claims priority to co-pending U.S. Provisional Patent Application having Ser. No. 60/689,878 filed Jun. 11, 2005 entitled "Emergency (disposable) car toilet", having a common applicant herewith.

FIELD OF THE DISCLOSURE

The disclosures made herein relate generally to toilets designed for use while traveling, and more particularly to vehicle seats having a toilet built into a seat portion thereof together with deployable privacy shades build into the vehicle seat back, roof or rear deck. The toilet equipped vehicle seat reduces the need to make restroom stops while traveling.

BACKGROUND

When people or families are traveling in an automotive vehicle such as a car, truck, van or bus, passengers may find they need the services of a public toilet facility. While traveling such a public toilet facility may not be within conveniently reachable travel distance, or if the driver is unfamiliar with the area, the driver may not know where to find such a facility. Typically, on highways and toll roads rest stops having stationary toilets placed at intervals within perhaps 20 to 60 miles or so between each. In an emergency situation where for the passenger the restroom need is more immediate, the advantage of a toilet built into one or more seats of the vehicle is obvious.

The use of portable toilets is known in the prior art. One variety of a portable toilet attaches to the trailer hitch and extends behind the vehicle. The toilet seat is unprotected and unsheltered and generally provides an elevated seat for one to rest upon, discharging directly onto the ground. This prior art vehicle toilet has several drawbacks including the need to pull off the road and park in a hidden or wooded area to avail oneself of the portable toilet. The prior art toilet has health and sanitation drawbacks as the toilet discharges directly onto the ground and the prior art vehicle toilet fails to provide privacy to the person using the toilet.

The portable toilet of the present inventive disclosure may advantageously be built into any flying mode of transportation such as a helicopter, a jet plane, a military helicopter, a submarine (any submersible mode of transportation), an ambulance, a stakeout police car or a detective car, a surveillance car, a taxi, among others. If there is any seat in any type or form of transportation vehicle, the emergency toilet of the present inventive disclosure can be advantageously employed as a standard or a requirement, if possible, to meet today's personal and modern emergency needs and to keep up with today's times.

Therefore, a toilet which is built into one or more seats of a vehicle, a toilet which captures and isolates waste into a sealable, removable and replaceable container, an emergency toilet which provides a deployable and extendable shade means which surrounds the person on the toilet in a non-transparent shade thereby blocking the person from view and providing privacy, an automotive toilet that is integrated with and supported from the vehicle interior, an automotive toilet that provides a privacy shade that is fast and easy to deploy, an emergency toilet that is integrated with the vehicle seat and that may be used without the person needing to move from the vehicle seat in which they are riding, such an emergency toilet would be useful and novel.

SUMMARY OF THE DISCLOSURE

Accordingly, the inventive disclosures made herein comprise various embodiments of an emergency toilet for a transportation means such as an airplane, helicopter, automobile, police car, ambulance, bus, taxi or submarine. The emergency toilet having portions integrated into the vehicle seat. Automotive vehicles such as cars may be advantageously equipped with a plurality of emergency automotive toilets integrated into driver and passenger vehicle seats. For an automobile application a typical configuration might be four toilets total, the two in front passenger seats and 2 in the rear passenger seats.

In a first and general embodiments of the inventive disclosures herein relate generally to a vehicle emergency toilet system having portions built into the seat of the vehicle. The emergency disposable car toilet system comprises a non-transparent shade means for providing privacy to a person using the toilet. The shade means is deployable and extendable between an elevated position about the head of the seated person downwards to the car seating surface so as to substantially conceal the person from the view of other vehicle passengers as well as from the view of people outside the vehicle. The car toilet system includes a storage means for storing the shade means in a compacted form until extended for use. The storage means can be pivotable arms attached to a seat back, head rest support, the rear window deck behind the rear seat, in a zip pouch in the vehicle roof liner, as well as other areas. The emergency toilet system includes a vehicle passenger seat incorporating the disposable toilet therein, the seat comprises a seat pan member for the person to sit upon. The seat pan member has a closable toilet access opening sized and positioned to serve as a toilet opening. The toilet opening extends completely through the pan member from the top seating surface through the seat pan and opening into the seat pan frame member over a waste receiving reservoir. The seat pan member has a retractable closure panel or door for the toilet access opening. The closure is movable within the seat pan member between a first closed position wherein the toilet access opening is concealed in the seat pan or seating surface and a second open position wherein the retractable closure is hidden within the seat pan member and the toilet access opening is fully open providing access to the car toilet waste reservoir from the automotive seat. The retractable toilet opening closure includes a first layer comprising seat pan member covering material, the covering material matching the covering material of the seat so that when the closure in the closed position concealing the toilet opening, the closure blends into the seat upholstery or fabric and does not call attention to its presence. The toilet opening closure further includes a second substantially rigid supportive layer secured to a bottom surface of the first layer, the retractable closure is sized to occlude and conceal the toilet access opening when in the first closed position. The vehicle seat is equipped with a means of releasably engaging and supportively maintaining the retractable closure in the first closed position wherein the seating surface or seat pan of the seat is a continuous seat surface without visible openings into the toilet access opening. The vehicle seat includes a track means secured to the seat pan frame member. The retractable closure rides upon the track means between a first closed position and the second open position with the track having an 'L' shaped path. A first lever is moveably secured to a side wall of the seat pan member. The first lever is actuated by the seated passenger to release the means of releasably engaging the retractable closure such that the retractable closure is free to drop down a vertical segment of the 'L' path of the track means and similarly drop down a segment of the toilet access opening thereby retracting the closure below a top surface of the seat pan member. The emergency toilet equipped vehicle seat further includes a second lever slidably secured to the side wall of the seat pan member. The second lever is connected to the retractable closure concealing the toilet opening in the seat. The second lever is operated to move the retractable closure between the first closed and second open positions. Located beneath the seat pan area and aligned with the toilet opening in the seat is a reservoir means for receiving and storing waste materials from the toilet. The reservoir means is provided with a removable closable portion configured to contain the waste for easy removal so as to facilitate disposal of the waste. A reservoir access door is slidably secured to an accessible side wall of the seat pan member of the toilet equipped vehicle seat. The access door conceals the reservoir. The access door can be opened to access the reservoir for removing waste. A reservoir support frame is secured to the seat pan frame member of the toilet equipped vehicle seat. The reservoir support frame is positioned below the toilet access opening. The waste receiving reservoir means discussed above is removably secured to the reservoir support frame.

In a second embodiment of the first and general embodiment discussed above, the emergency disposable toilet system for a seat of a vehicle includes a shade storage means comprising two elongated arm shade support rods, each rod is secured on a first end to a head rest support rod with each rod projecting towards the sides of the seat back rest member. The shade means includes two elongated extension tubes having a bore through a substantial length of the tube, each tube uniquely is secured in a substantially vertical alignment to the second end of the arm shade support rods, each extension tube has bore opening at a top end of the extension tube. Two elongated extension rods, each having a lower end uniquely telescopically received in the bore of the extension tubes can be telescopically extended upwards. A latching means is provided for fixing the telescopic position of the extension rod in the extension tube. An elongated first shade arm is pivotally secured at one end to an upper end of first extension rod, such that the first arm is free to pivot between a lowered position substantially aligned with the seat back to a substantially horizontal raised position for use. Similarly, an elongated second shade arm is pivotally secured to an upper end of a second extension rod such that the second arm is free to pivot between a lowered position aligned with seat back to a substantially horizontal raised position. The first and second arms extend from the headrest area of the seat back then forward to the front edge limit of the seat pan or seating surface of the automotive seat. An elongated third arm has a first end pivotally secured to the end of the far end of the first arm near the seat front edge. The opposing second end of the third arm is configured to detachably engage the far end of the second arm over the front edge of the seat. The third arm is pivotable between a storage position in which the third arm is aligned with the second arm, then to an engaging position wherein the third arm spans between the far ends of the first and second arms such that the first second and third arms act with the seat back rest to completely surround the person seated on the toilet equipped vehicle seat, thereby providing privacy. In this embodiment the shade means comprises three rolled, thin, flexible, extendable shades, each shade rollably and extensibly secured into the elongated shade arms. Each shade has a length substantially the same as the shade arm. The extendable shades are removable from the arm for replacement. The shades are sized to mate along side edges fully concealing the person when extended. The extensible shade material is a light weight non-transparent plastic. The shades are available in many different colors with the primary colors being red, white, yellow, blue, green, black and the tropical colors. The shades are rolled onto rods in the shade arms much like a window shade. The shades, once extended, are not retractable but are instead intended to be discarded and replaced with new shades. A shade handle is secured to each extendable shade, the shade handle for grasping to extend the shade from the shade arms. In this embodiment the means of holding the shade means in an elevated expanded position is accomplished through the pivot connections between the first, second shade arms and the upper portion of the extension rods. The pivot means provide indents in the pivot surfaces which provide increased resistance to downwards movement of the shade arms after the are raised to the horizontal position, the increased resistance is sufficient to hold the first and second arms in the raise horizontal position to provide a privacy shade to the person seated on the toilet equipped vehicle seat.

In a third embodiment of the first and general embodiment discussed above, the emergency disposable toilet system for a seat of a vehicle has a shade means comprising a collapsible extensible thin walled flexible plastic duct shaped shade having circumferential rings spaced at intervals along the length of the duct, the rings are spaced and formed to hold the thin walled plastic shade material in the desired shape. The rings are preferably light weight plastic rings or light weight metallic rings. The collapsible rings collapsible against each other to collapse the shade for storage, the shade is sized to be extensible downwards around and conceal the person from view and having interior dimensions selected to fit around the person seated on the toilet equipped vehicle seat. When extended, the shade completely surrounds the seated person concealing the person from the view of other vehicle passengers as well as from the view of people on the exterior of the vehicle. The shade is made of a light weight flexible non-transparent plastic material. The storage means of the disposable car toilet system with this shade comprises a zippered shade storage pouch built into the interior roof lining of the vehicle over the toilet equipped seat. The zippered storage pouch is configured to store and retain the collapsible extensible duct shade into the interior lining of the vehicle roof. The means of holding the shade means in a elevated expanded position comprises a plurality of support chains, preferably two support chains. The first end of each chain is secured to the vehicle roof; the opposing second end of each chain is secured to a top portion of the collapsible extensible duct shade so as to support the shade in an elevated position from the vehicle roof.

Certain additional embodiments of the second or the third embodiments discussed above have a reservoir means comprising an inverted pyramid shaped bin holder formed of connected wire rods forming the corners and edges of the pyramid. The bin holder pyramid has open sidewalls between the formed wire rods. The narrow portion of the pyramid truncates in a circular rim. Each rod forming the side wall corners of the pyramid has an inwards protruding member or projection secured at a mid portion of the length of the rod. The inverted pyramid shaped bin holder has one or more clasps for securing the bin holder to the seat pan frame member under the toilet equipped vehicle seat. A bowl shaped metallic waste bin has a hole through the side of the bin for receiving a closure string therethrough. The bin is sized and adapted to be received into and supported by the wire rod inverted pyramid bin holder. The metallic bin comprises a plurality of protruding rounded arc members spaced about, extending upwards from and secured to a top ring of the bowl of the bin. A plurality of indents are provided in the side of the bowl of the metallic bin, the indents sized and positioned to align with and engage with the inwards protruding members of the pyramid shaped bin holder. The metallic bin has a tubular extension having a closed bottom end. The tubular extension is joined to and secured to the bottom of the bowl shaped waste bin. The tubular extension is sized and configured to be received through the circular rim of the pyramid shaped bin holder. In these embodiments the removable closable portion of the reservoir means comprises a two layer disposable replaceable plastic waste receiving bag. The waste receiving bag has an outer layer and an inner layer. The outer layer having a plurality of indents in the side of the outer layer, the indents are sized and positioned to align with and engage with the inwards protruding members of the bowl of the waste bin which align with the protruding members of the pyramid shaped bin holder. A plurality of ring members is secured to an upper edge of the outer layer. The rings are sized, configured and positioned to engage onto the protruding rounded arc members of the metallic waste bin bowl. The inner layer of the waste receiving bag has an upper edge circumferentially equipped with a draw string for closing the top portion of the inner layer so as to seal the inner layer and provide a closable waste receiving reservoir to contain the waste for eventual disposal.

Certain other additional embodiments of the second or the third embodiments discussed above have a reservoir means comprising a raised plastic rod platform having two spaced substantially parallel plastic toilet bowl support rods. Each support rod has a plurality of rings along the outer surface of the rod. The platform is secured to the seat pan frame member below the vehicle seat and aligned generally with the toilet opening in the seat. The reservoir means has a plastic toilet bowl having a hole for a closure string through the wall of the bowl. The toilet bowl comprises a plurality of protruding rounded arc members spaced about, extending upwards from and secured onto the top ring of the plastic bowl. The plastic toilet bowl includes a tubular extension having a closed bottom end, the tubular extension secured to bottom of the bowl. The removable closable portion of the reservoir means comprises a two layer disposable replaceable plastic waste receiving bag, similar in form and construction to the plastic waste receiving bag disclosed in the previous additional embodiments. The waste receiving bag has an outer layer and an inner layer. A plurality of ring members are secured to an upper edge of the outer layer of the plastic waste receiving bag. The rings are sized, configured and positioned to engage onto the protruding rounded arc members of the plastic toilet bowl. The inner layer of the waste receiving bag has an upper edge circumferentially equipped with a draw string for closing the top portion of the inner layer so as to seal the inner layer and provide a closable waster receiving reservoir to contain the waste for eventual disposal.

The purchaser has a choice of having the shade arms (amenity) or the plastic duct shade (amenity) built into the vehicle prior to purchase of vehicle. They also have a choice of not buying either of these two amenities to shade themselves and provide privacy. The purchaser may just purchase the toilet portions integrated into the vehicle seat (amenity). The plastic duct shade would be available in a plurality of sizes to fit the size and shape of the passenger. Each of the two shade amenities has its' own advantages. With the plastic duct amenity, you do not need to buy more shades, and you never have to replace shades. However, the plastic duct amenity will cost more, since it might be custom made to fit the person. The shade arms (amenity) provides more space to the person using the toilet equipped seat and prevents the person from feeling tightly confined (claustrophobic). Another advantage to the shade arm (amenity) is that it cost less to build into your vehicle. The disadvantage to the shade arm (amenity) is that you must replace the shades after each use. Another advantage to the shade arm (amenity) is that this is good for people who like constant change, various colors, choices, and fin. The shades for the shade arm (amenity) come in many different colors with the primary colors being red, white, yellow, blue, green, black, orange and the tropical colors.

It is an objective of the inventive disclosure made herein to provide an emergency toilet that is directly integrated into one or more seats of a transportation vehicle.

It is another objective of the inventive disclosure made herein to provide an emergency toilet that can be integrated into one or more seats of an automotive vehicle.

It is another objective of the inventive disclosure made herein to provide an emergency toilet that captures and isolates waste into a sealable, removable and replaceable container removably concealed under the seat.

It is another objective of the inventive disclosure made herein to provide an emergency toilet that provides a deployable and extendable shade means which surrounds the person on the toilet in a non-transparent shade thereby blocking the person from view and providing necessary privacy.

It is another objective of the inventive disclosure made herein to provide an emergency toilet having privacy shade components integrated with and support from the vehicle interior.

It is another objective of the inventive disclosure made herein to provide an emergency toilet that provides a privacy shade that is fast and easy to deploy.

It is another objective of the inventive disclosure made herein to provide an emergency toilet that is integrated with the vehicle seat and that may be used without the person needing to move from the vehicle seat in which they are riding.

These and other objects of the invention made herein will become readily apparent upon further review of the following specification and associated drawings.

BRIEF DESCRIPTION OF THE DRAWINGS

The drawings show a form of the invention that is presently preferred; however, the invention is not limited to the precise arrangement shown in the drawings.

DETAILED DESCRIPTION OF THE DRAWINGS

In preparation for explaining the details of the present inventive disclosure, it is to be understood by the reader that the invention is not limited to the presented details of the construction, materials and embodiments as illustrated in the accompanying drawings, as the invention concepts are clearly capable of other embodiments and of being practiced and realized in various ways by applying the disclosure presented herein.

Figure 1:
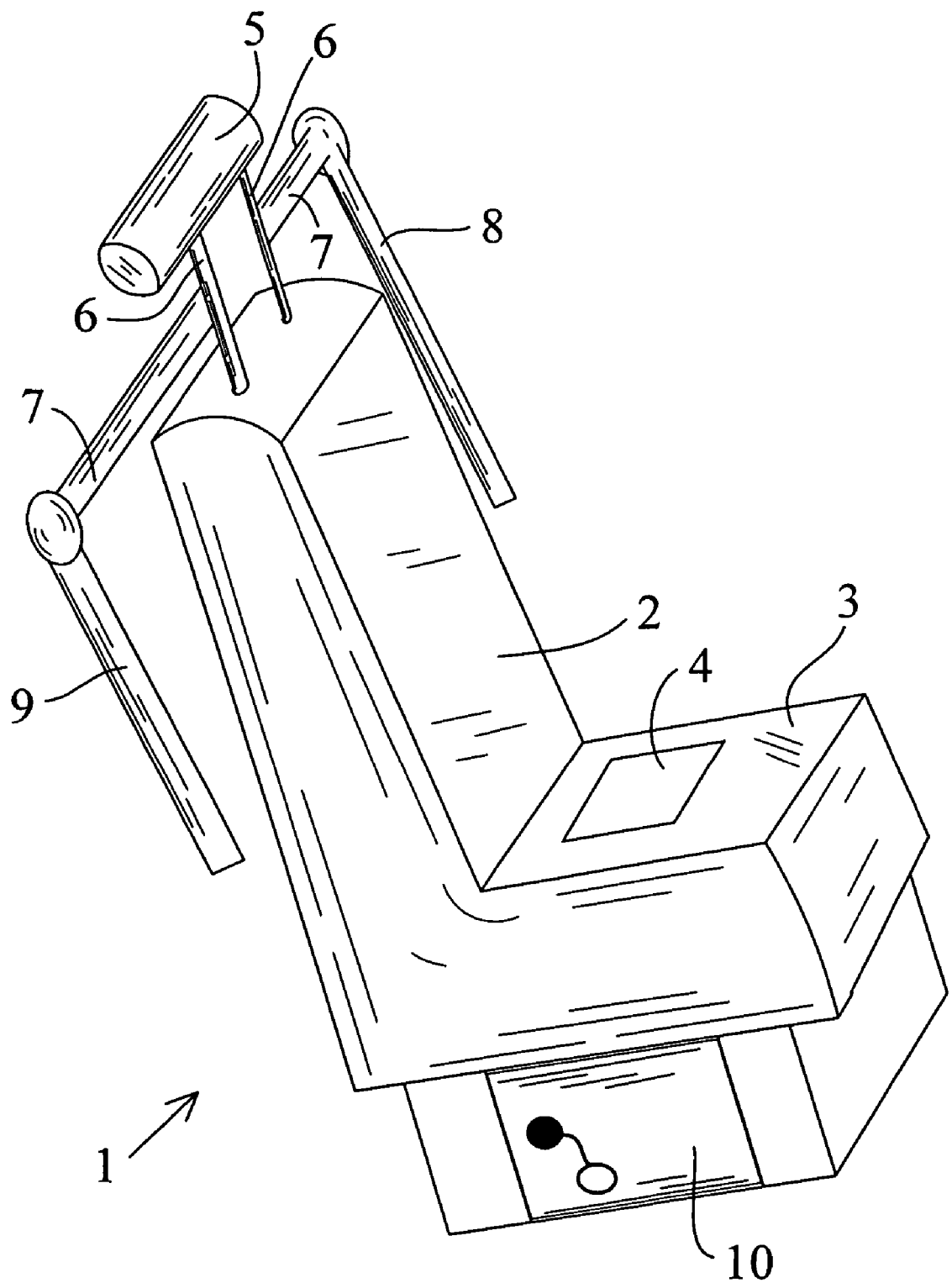
FIG. 1 depicts a perspective view of one embodiment of an emergency toilet that is integrated with the vehicle seat including shade arms pivotally secured to the head rest support, in accordance with the inventive disclosures herein.
Figure 2:
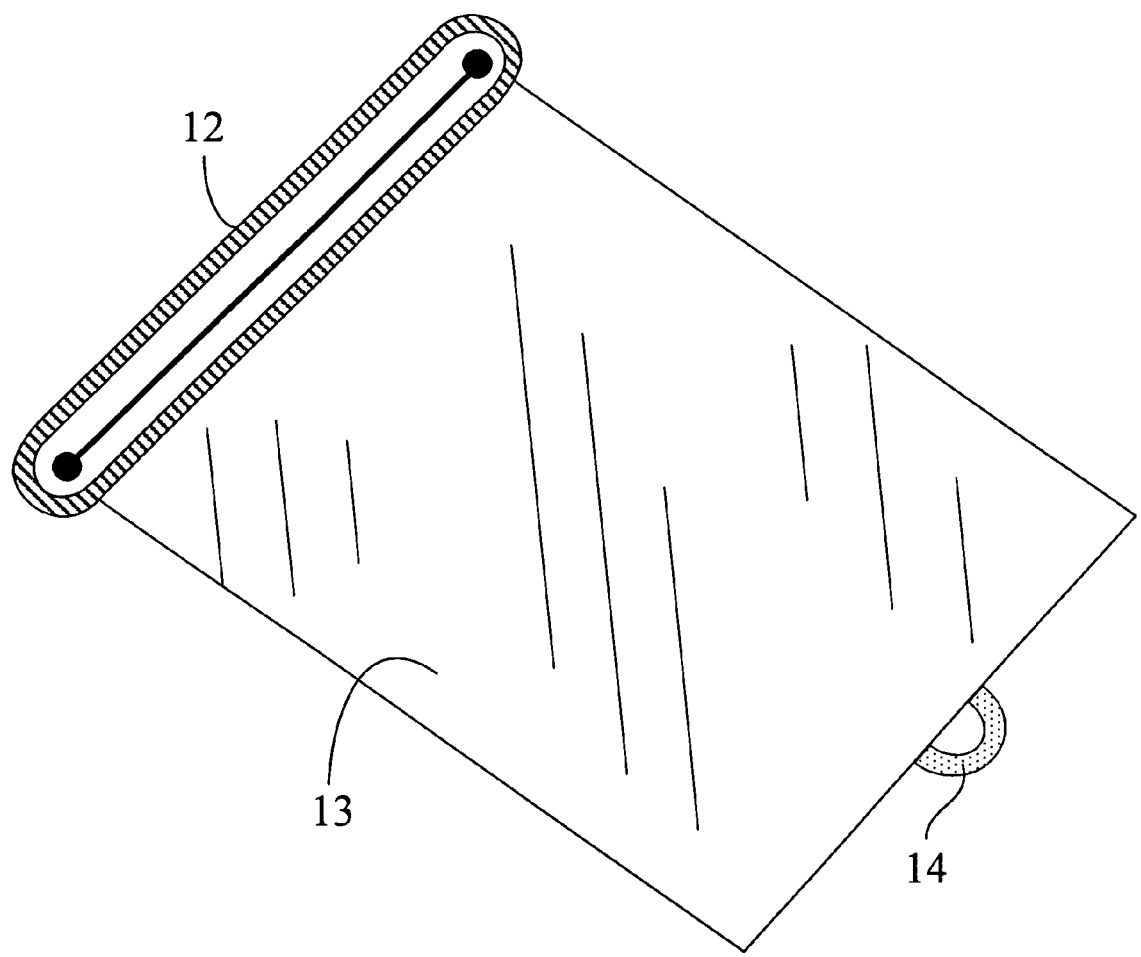
FIG. 2 depicts one embodiment of extensible shade extended from a shade arm, in accordance with the inventive disclosures herein.

FIG. 1 depicts a perspective view of one embodiment of an emergency toilet that is integrated with the vehicle seat including shade arms pivotally secured to the head rest support, in accordance with the inventive disclosures herein. Vehicle seat 1 has a seat back rest member 2 and a seat pan member 3. The seat pan is another name for the surface upon which the person is seated. A retractable closure 4 for an integrated toilet access opening is provided in a portion of the seat pan member 3 seating surface. A vehicle head rest 5 is secured to an upper portion of the seat back rest member 2 by one or more head rest support rods 6. Two elongated arm shade support rods 7, each rod secured to a head rest support rod 6, each rod projects outwards towards sides of the seat back rest member 2. Elongated arms are pivotally mounted to the arm shade support rods 7; depicted is a first shade arm 8 and a second shade arm 9. The shade arms are free to pivot between a lowered position aligned with seat back to a substantially horizontal raised position for use. The pivot means of mounting the shade arms to the arm shade support rods include indents in the pivot surfaces which provide increased resistance to downwards movement of the shade arms when the arms are raised to the horizontal position, the increased resistance is sufficient to hold the first and second arms in the raise horizontal position for use. The vehicle seat 1 includes a reservoir access door 10 which is slidably secured to a car door facing side wall of the seat pan member. The access door 10 conceals the removable disposable toilet waste receiving reservoir. The access door 10 is openable to access the reservoir for removing waste FIG. 2 depicts one embodiment of extensible shade extended from a shade arm, in accordance with the inventive disclosures herein. The shade arm 12 is either a first or second shade arm, as discussed above. Each shade arm has an extendable shade 13 which is compactly wound about a storage rod, the rod and shade are removably secured to an inner portion of the shade arm 12. Once extended, the shade is not retractable but is instead replaced with a new shade. The shade is a non-transparent shade means for providing privacy to a person using the toilet facility built into the vehicle seat. The shade is extendable from a compacted form to extend between the elevated near horizontal position of the shade arms extending downwards to the car seating surface substantially concealing the person from view. The shade 13 is a very lightweight non-transparent material and is available in many different colors with the primary colors being red, white, yellow, blue, green, black, orange and the tropical colors. The shade has a shade handle 14 for grasping to extend the shade 13 from the shade arm 12.

Figure 3:
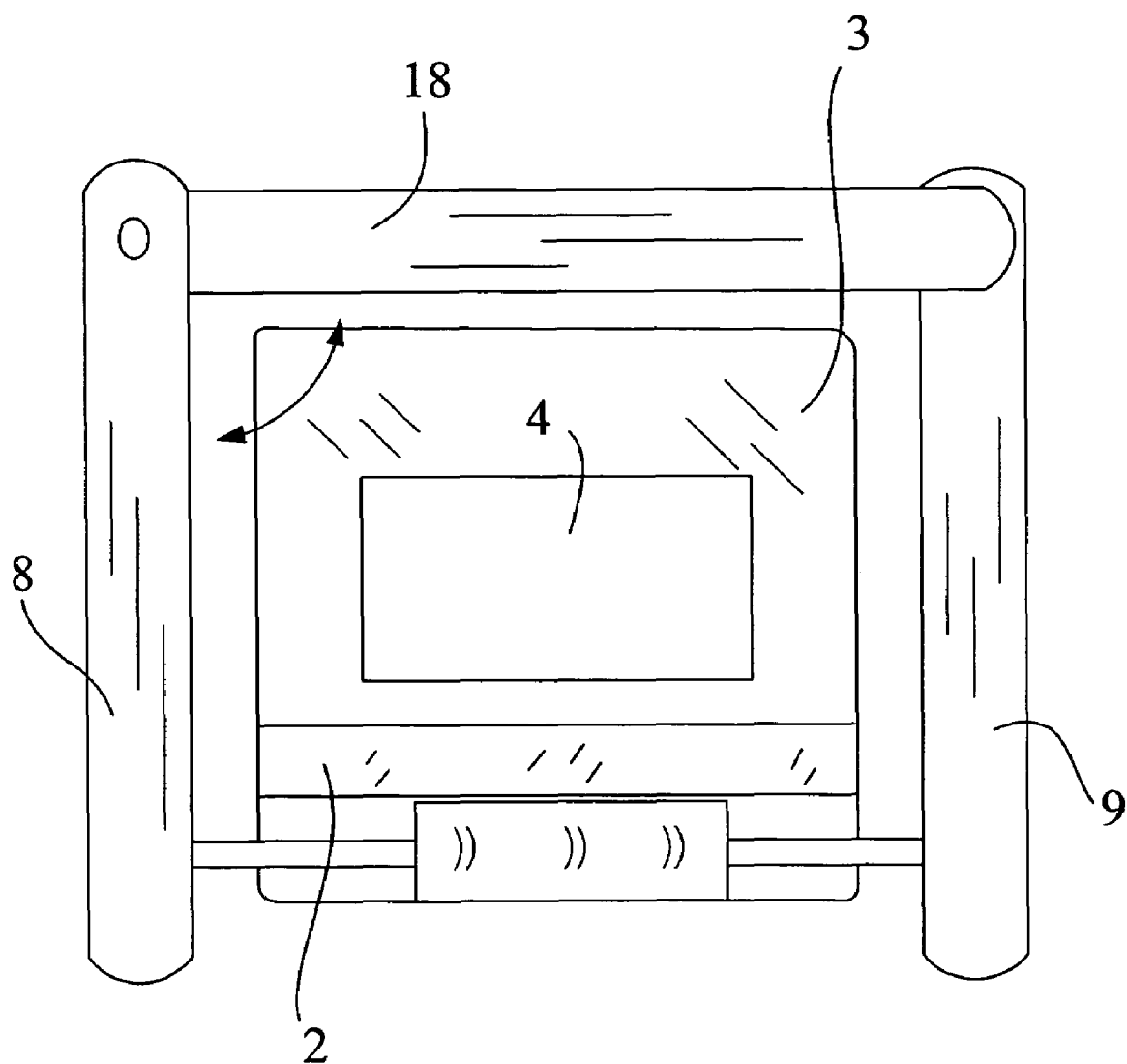
FIG. 3 depicts one embodiment of the shade arm members showing pivot points and closure position prior to extending the extensible shade members from the rolls in each arm.

FIG. 3 depicts a top view of one embodiment of the shade arm members showing pivot points and closure position prior to extending the extensible shade members from the rolls in each arm. Third shade arm 18 is pivotally secured to first shade arm 8 such that the third shade arm is pivotal between a storage position under the first shade arm 8 to the illustrated extended position where it bridges between the first 8 and second 9 shade arms. The shade arms together with the seat back rest 2 close around the seat such to conceal the person using the toilet-equipped seat from view.

The first arm 8 and the second arm 9 which extend out horizontally are strong enough to stand out extended horizontally (made of heavier plastic than the third arm 18). After these two arms (8 and 9) are pulled upwards to extend horizontally, the third arm 18 is pulled out horizontally from first arm 8. Then, third arm 18 is pushed forward horizontally away from the front of the person sitting in the seat. Then, the hole or socket at the distal end of the arm 18 is received onto a pin secured to a top surface of arm 9, thereby securing the third arm in the bridged position between arms 8 and 9. Arm 18 is made of very light plastic (lighter than arm 8 and arm 9), so arm 18 can stay in a horizontal position between the distal ends of shade arms 8 and 9.

Figure 4:
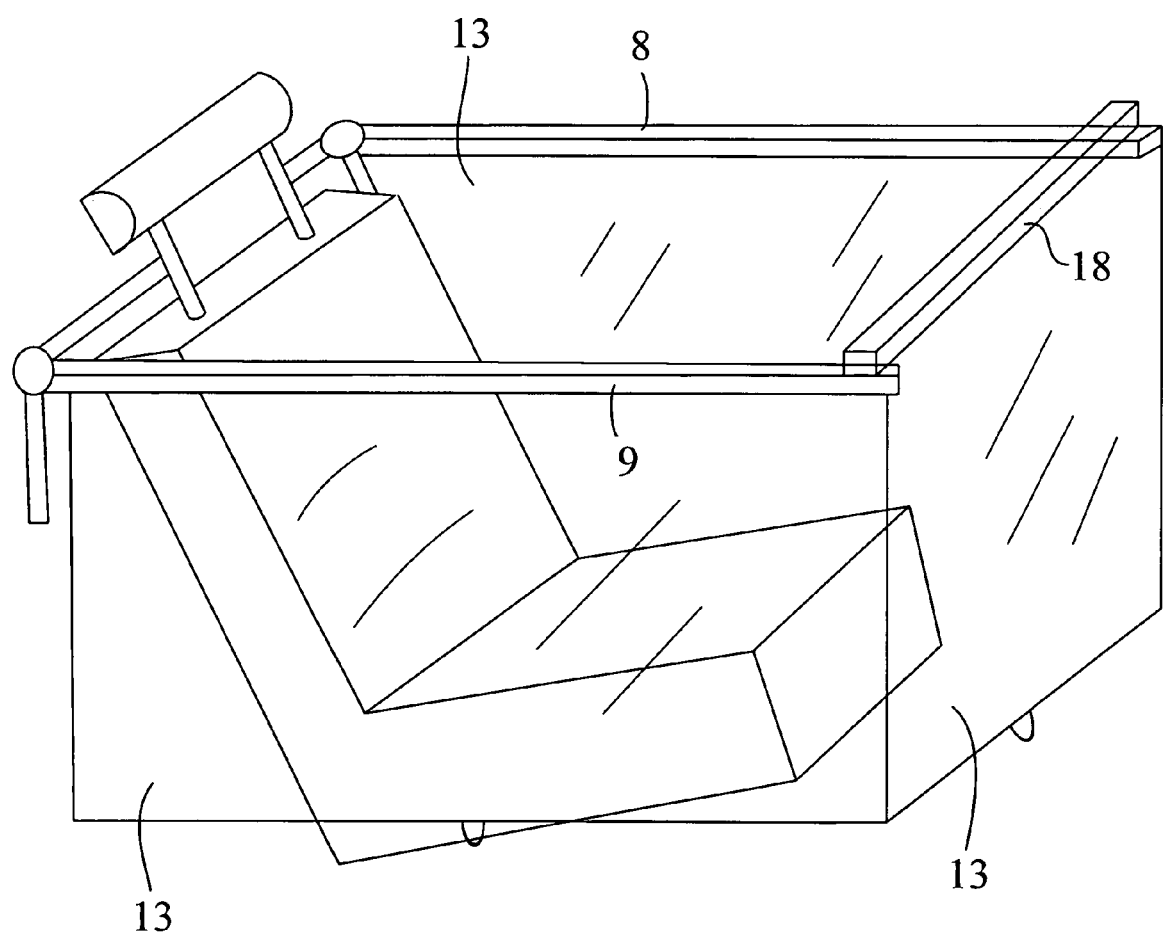
FIG. 4 depicts a perspective view of one embodiment of an emergency toilet that is integrated with the vehicle seat including shade arms pivoted outwards around the seat and occupant with extensible shades deployed for privacy.

FIG. 4 depicts a perspective view of one embodiment of an emergency toilet that is integrated with the vehicle seat including shade arms pivoted outwards around the seat and occupant with extensible shades deployed for privacy. First 8, second, 9 shade arms are deployed for use substantially horizontal, and the third shade arm 18 bridges between the distal ends of shade arms 8 and 9. Extensible shades 13 extend downwards from the shade arms to provide privacy to the person using the toilet equipped vehicle seat.

Figure 5:
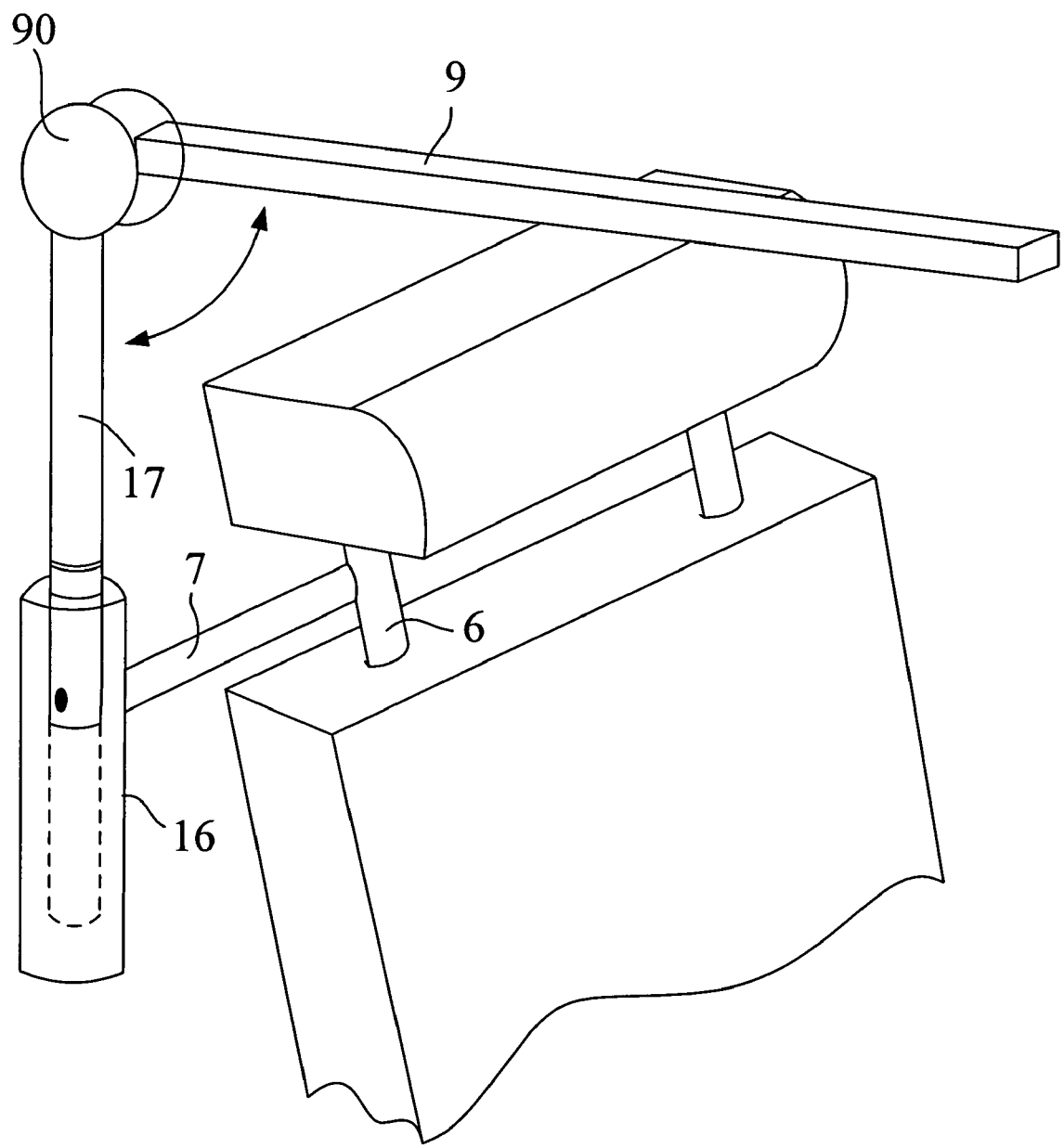
FIG. 5 depicts a perspective view of one embodiment of the extension tube and extension rod along with a pivotally connected shade arm, in accordance with the inventive disclosures herein.

FIG. 5 depicts a perspective view of one embodiment of the extension tube and extension rod along with a pivotally connected shade arm, in accordance with the inventive disclosures herein. Extension tube 16 is secured to the headrest support rod 6 by arm shade support rod 7. The extension tube 16 has a bore for telescopically receiving the extension rod 17 therein. The pivot means 90 between extension tube and extension rod permit the shade arm 9 to be elevated to a higher position to provide better privacy. The pivot means provides indents in the pivot surfaces which provide increased resistance to downwards movement of the shade arms after the arms are raised to the horizontal position, the increased resistance is sufficient to hold the first and second arms in the raise horizontal position during use. In FIG. 5 only one extension tube and shade arm are shown, the other side of the vehicle seat being similarly equipped.

Figure 6:
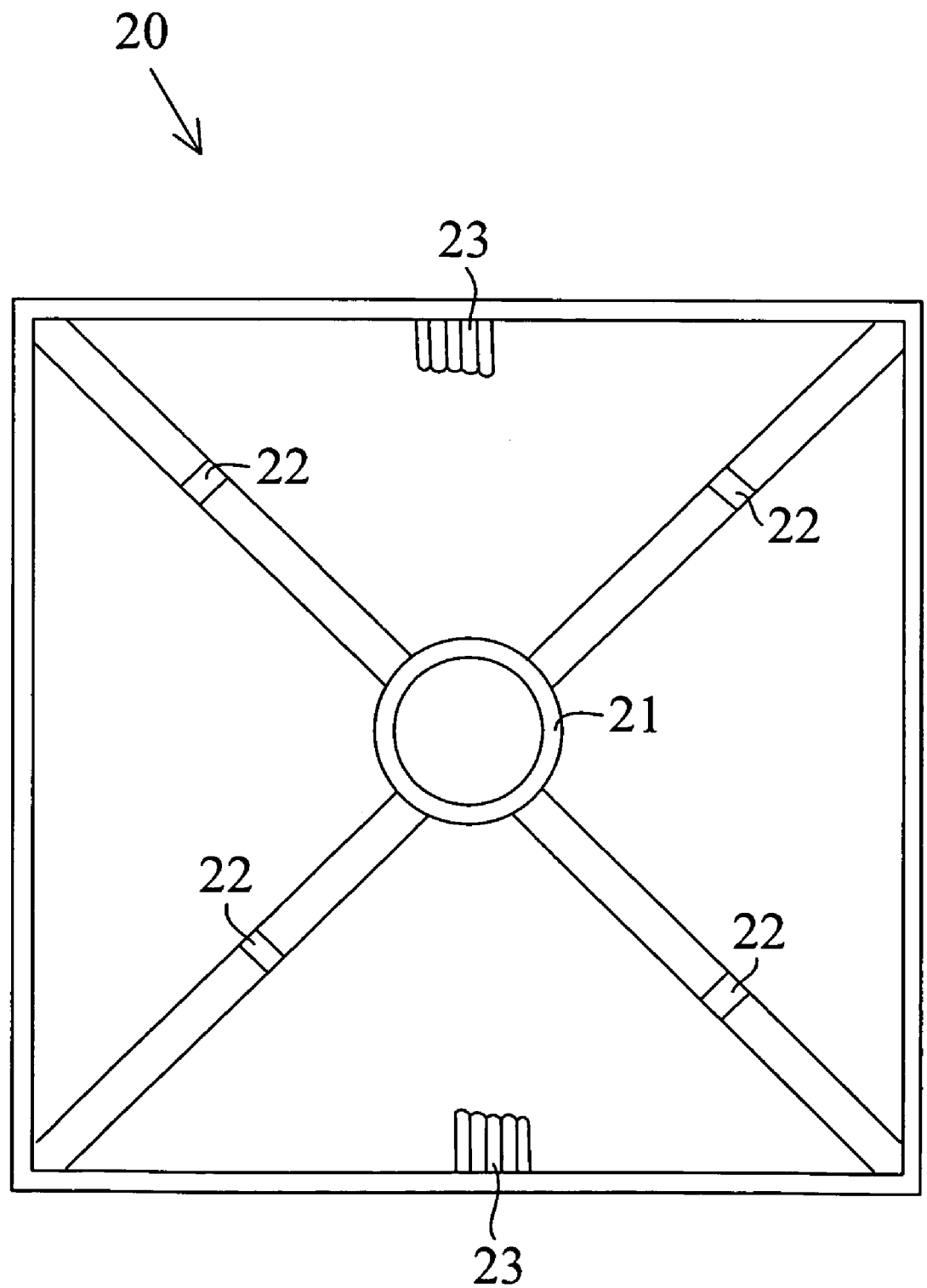
FIG. 6 depicts a top view of one embodiment of the metallic rod inverted pyramid shaped bin holder, in accordance with the inventive disclosures herein.

FIG. 6 depicts a top view of one embodiment of the metallic rod inverted pyramid shaped bin holder, in accordance with the inventive disclosures herein.

Figure 7:
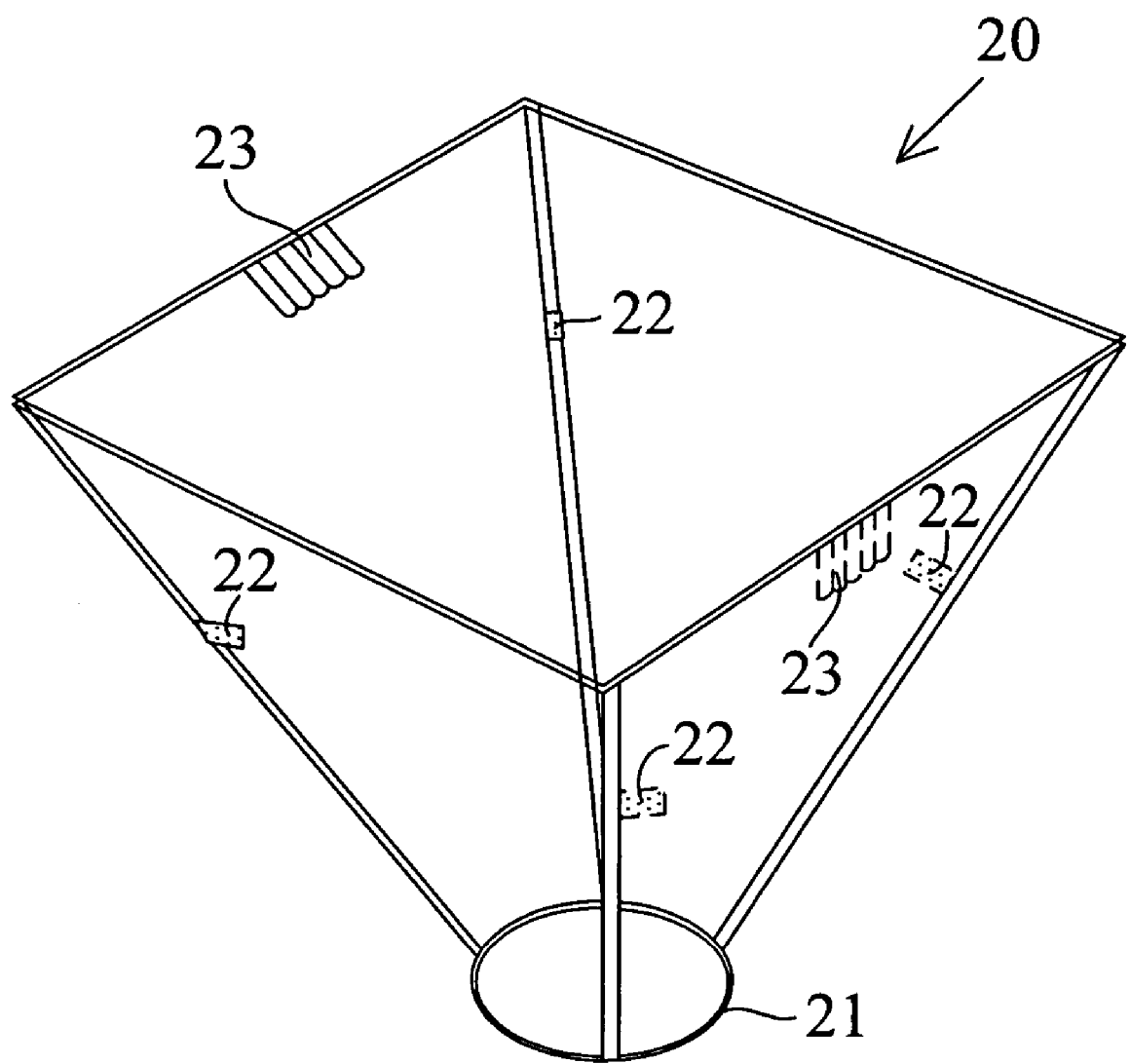
FIG. 7 depicts a perspective view of the bin holder or FIG. 6 depicting the protrusions on the corner rods, in accordance with the inventive disclosures herein.

FIG. 7 depicts a perspective view of the bin holder or FIG. 6 depicting the protrusions on the corner rods, in accordance with the inventive disclosures herein. An inverted pyramid shaped bin holder 20 is formed of connected wire rods. The bin holder has open sidewalls. The narrow portion of the pyramid truncates in a circular rim 21. Each rod forming the sidewall corners of the pyramid has an inward protruding member 22 secured at a mid portion of its length. The bin holder has one or more clasps 23 for securing the bin holder to the seat pan frame member.

Figure 8:
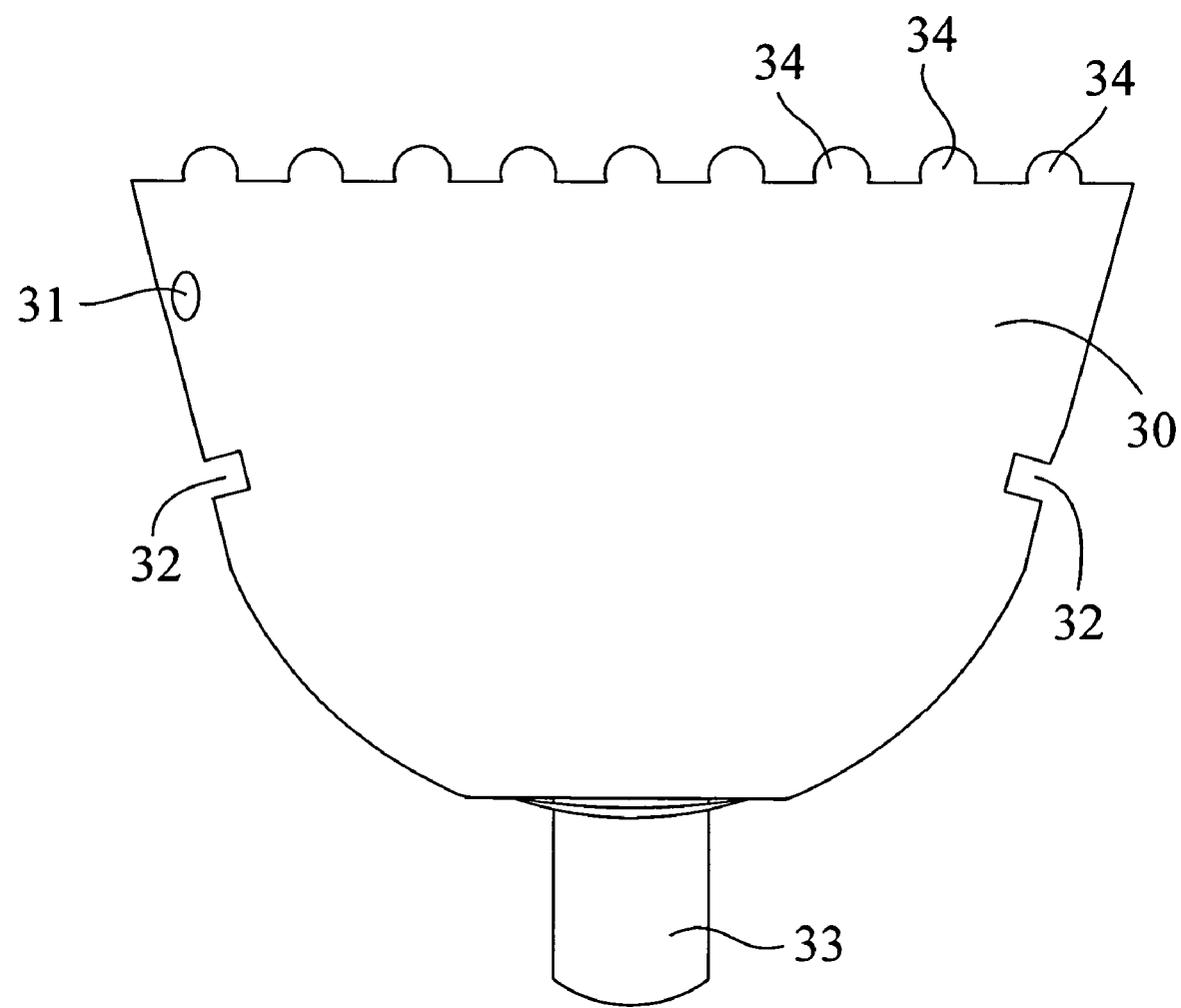
FIG. 8 depicts a side view of the metal waste bin for use with the bin holder or FIG. 6, in accordance with the inventive disclosures herein.

FIG. 8 depicts a side view of the metal waste bin for use with the bin holder or FIG. 6, in accordance with the inventive disclosures herein. The bowl shaped metallic waste bin 30 has a hole 31 for a closure string of a disposable plastic waste bag (not shown) to pass through. The bin is sized and adapted to be received into and supported by the bin holder of FIG. 6 and FIG. 7. The metallic bin has a plurality of protruding rounded arc members 34 spaced about the upper periphery edge of the bowl and extending upwards. A plurality of indents 32 or depressions are formed into the side of the bowl 30, the indents sized and positioned to align with and engage with the inwards protruding members 22 of the bin holder 20. The metallic waste bin 30 has a tubular extension 33 having a closed bottom end. The tubular extension is sized and configured to be received through the circular rim 21 of the bin holder 20.

Figure 9:
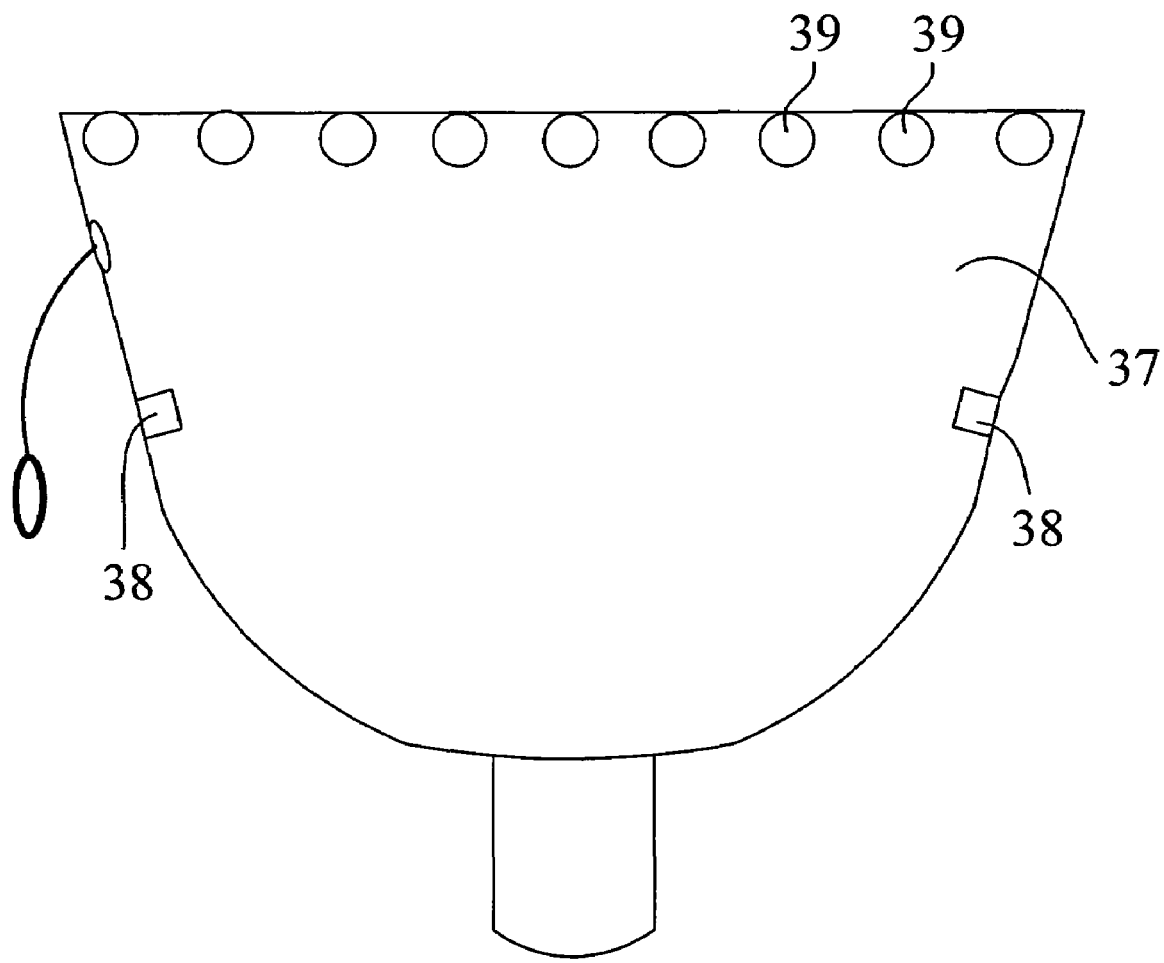
FIG. 9 depicts a side view of a two layer disposable plastic waste-receiving bag for use with the metal waste bin of FIG. 8, in accordance with the inventive disclosures herein.

FIG. 9 depicts a side view of a two layer disposable plastic waste-receiving bag for use with the metal waste bin of FIG. 8, in accordance with the inventive disclosures herein. Two layer waste receiving bag 37 has an outer layer having a plurality of indents or depressions 38 in the side of the outer layer. The indents are sized and positioned to align with and engage with the inwards protruding members of the bin holder. A plurality of ring members 39 is secured to an upper edge of the outer layer. The rings are open in their center and are sized, configured and positioned to engage onto the protruding rounded arc members 34 of the metallic waste bin 30. The two layer plastic waste receiving bag has an inner layer (not shown) having an upper edge circumferentially equipped with a draw string for closing the top portion of the inner layer of the bag, while the outer layer remains secured by the ring members 39 to the metallic bin.

Figure 10:
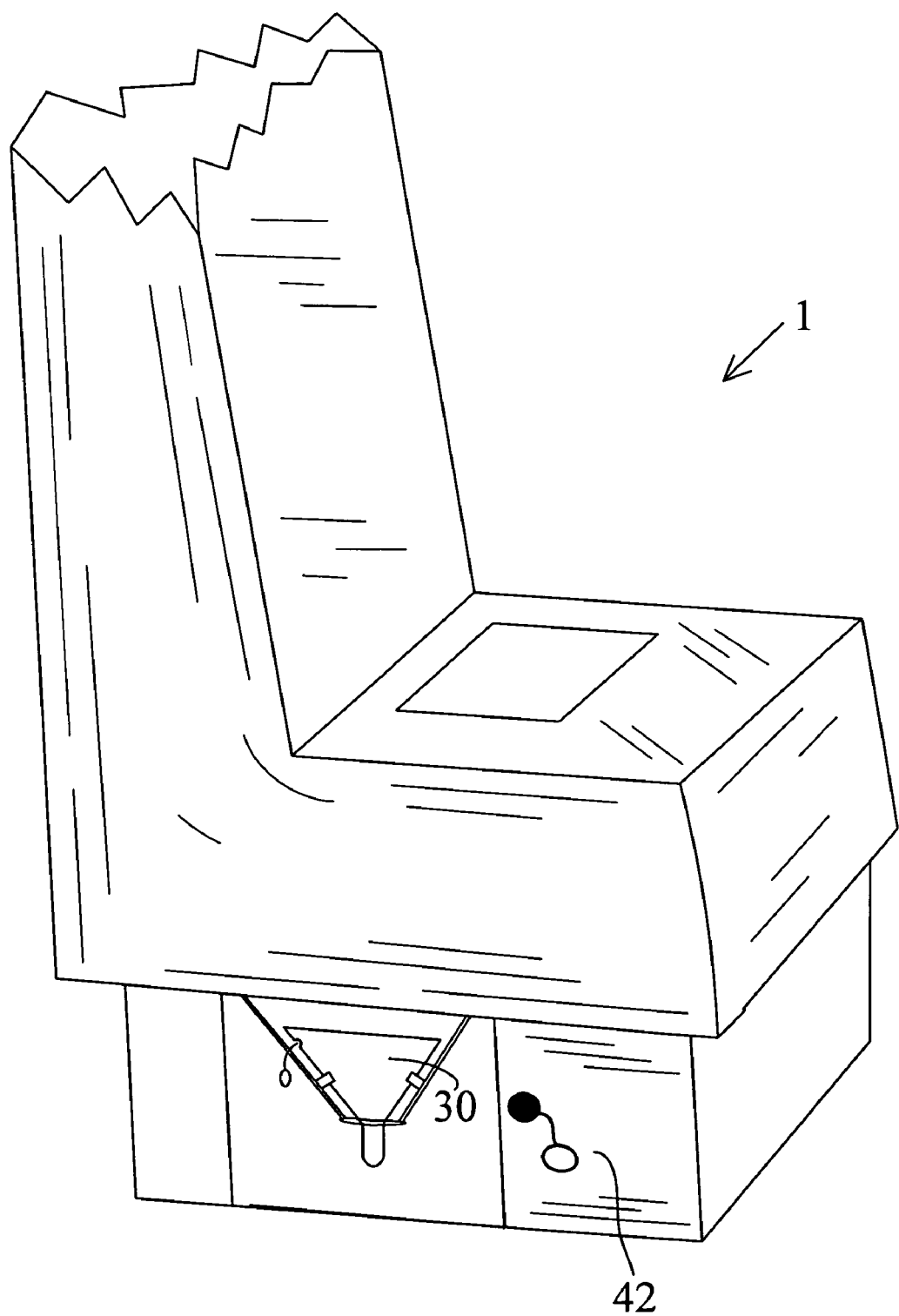
FIG. 10 depicts a side view of a vehicle seat equipped with a toilet in accordance with the inventive disclosures herein. The seat has a sliding access door for access to the waste-receiving bag; door is in an open position.

FIG. 10 depicts a side view of a vehicle seat 1 equipped with a toilet in accordance with the inventive disclosures herein. The seat has a sliding reservoir access door 42 for access to the metallic waste-receiving bin 30. The door illustrated is in an open position. The reservoir access door is slidably secured to a car door facing sidewall of the seat pan member. The access door conceals the waste bin and two layer waste receiving bag.

Figure 11:
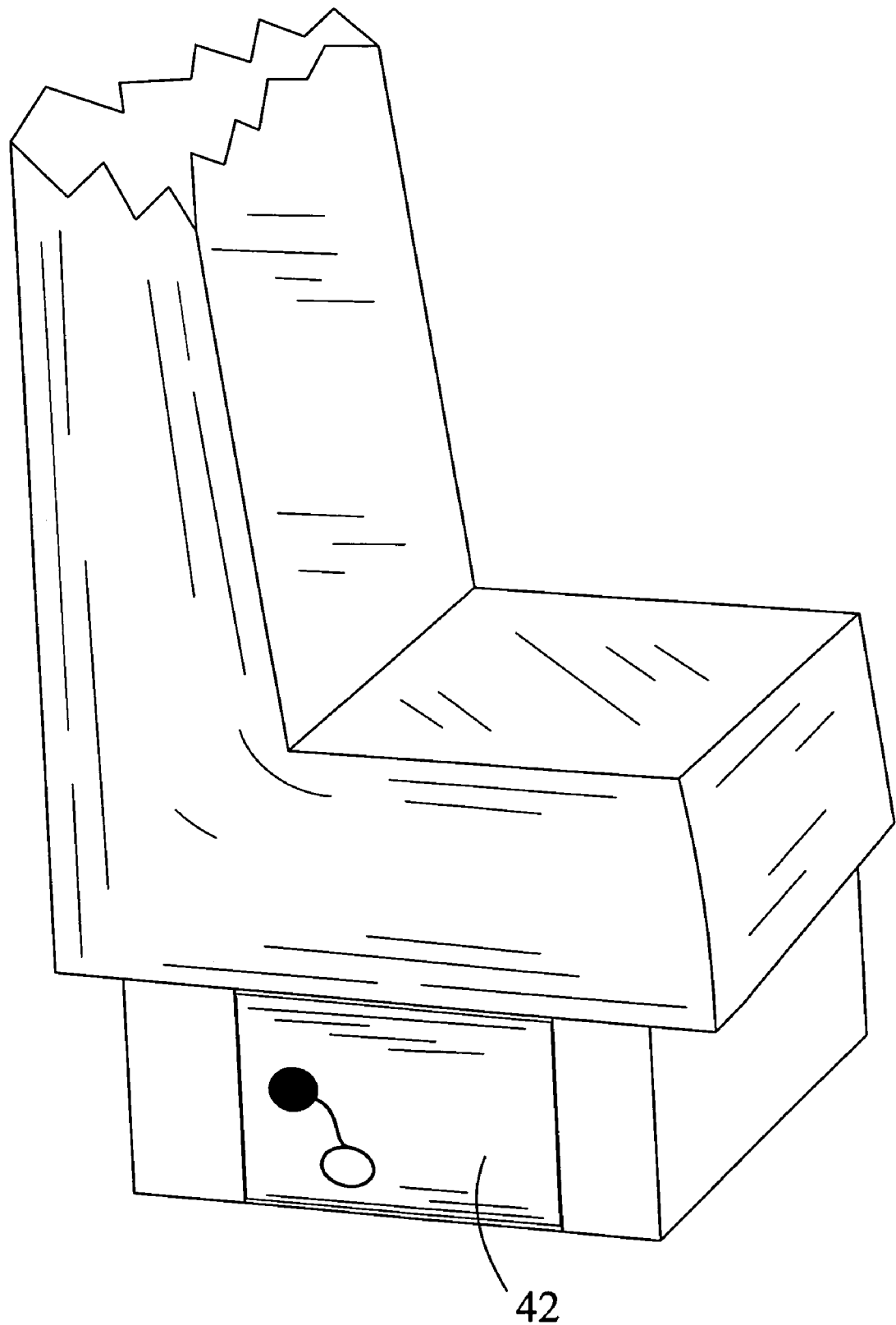
FIG. 11 depicts a side view of a vehicle seat equipped with a toilet in accordance with the inventive disclosures herein. The seat has a sliding access door for access to the waste-receiving bag; door is in a closed position.

FIG. 11 depicts a side view of a vehicle seat 1 equipped with a toilet in accordance with the inventive disclosures herein. The seat has a sliding access door 42 for access to the waste-receiving bag, door is in a closed position.

Figure 12:
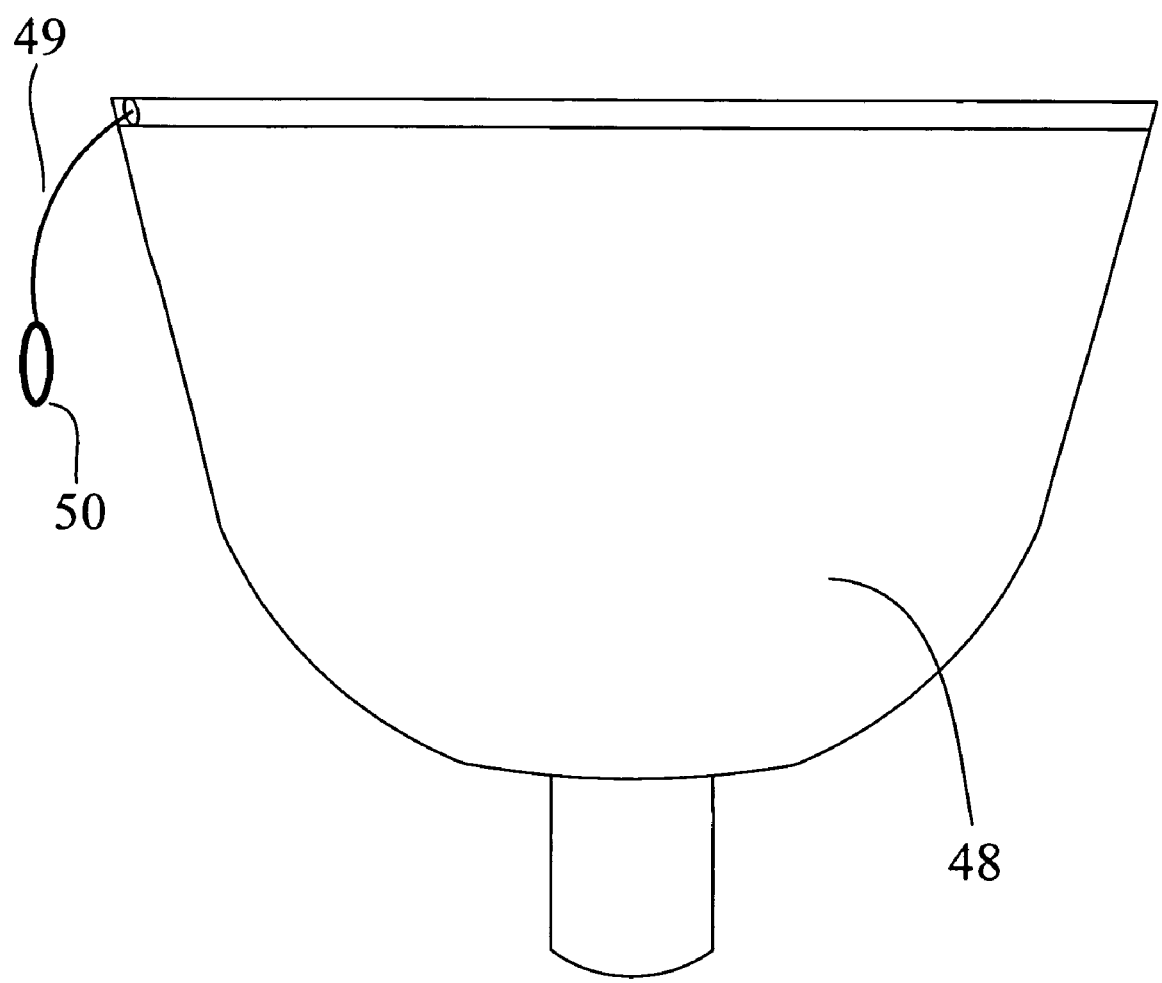
FIG. 12 depicts a side view of only the inner layer of the two layer disposable plastic waste receiving bag showing the draw string with loop or oval grasp member.
Figure 13:
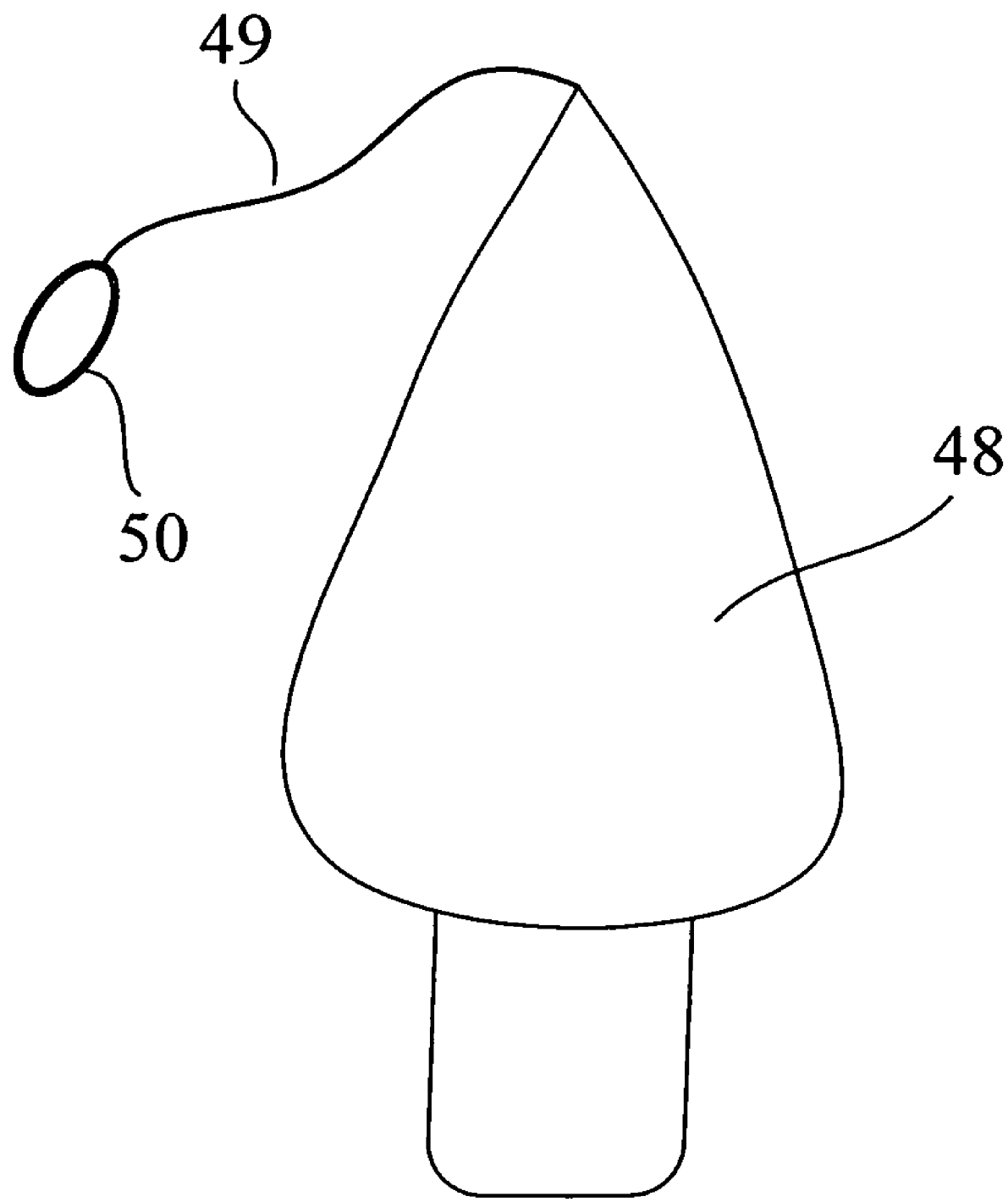
FIG. 13 depicts a side view of only the inner layer of a two layer disposable plastic waste receiving bag showing the draw string with loop or oval grasp member after the draw string has been drawn to close the inner layer of the bag.

FIG. 12 depicts a side view of only the inner layer 48 of the two layer disposable plastic waste receiving bag showing the draw string 49 with loop or oval grasp member 50. FIG. 13 depicts a side view of only the inner layer of a two layer disposable plastic waste receiving bag showing the draw string 49 with loop or oval grasp member 50, after the draw string have been drawn to close the inner layer of the bag, thereby sealing the toilet waste inside. When the drawstring closes the inner layer 48, the inner layer separates from the outer layer 37 FIG. 9 while remaining inside the outer layer of the bag.

Figure 14:
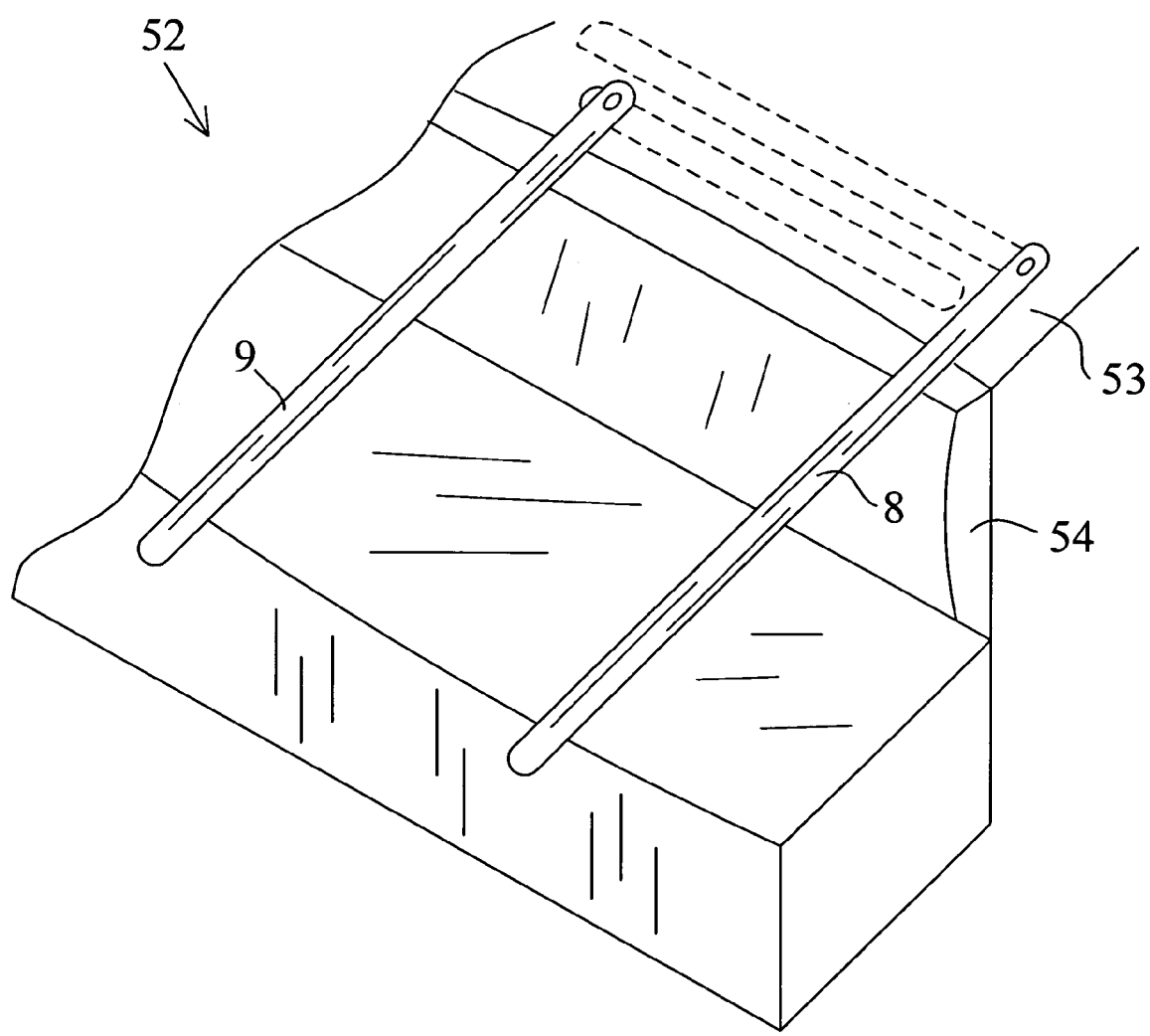
FIG. 14 depicts a perspective view of a vehicle rear seat equipped with toilet and arm shade members in accordance with the inventive disclosures herein.

FIG. 14 depicts a perspective view of a vehicle rear seat 52 equipped with first 8 and second 9 arm shade members in accordance with the inventive disclosures herein. The arm shade members are pivotally secured to a rear window deck 53 between the seat back 54 and rear window of an automotive vehicle. When not in use, the arm shades are stored upon the rear window deck 53. For use the arm shades are pivoted forward as illustrated. Once the first and second arm shades arm pivoted forward, the third arm is pivoted out and shades deployed exactly as discussed and shown in FIG. 4. The third arm is stored beneath the first arm 8 and pivots to bridge between the first and second arms, and then the shade is deployed.

Figure 15:
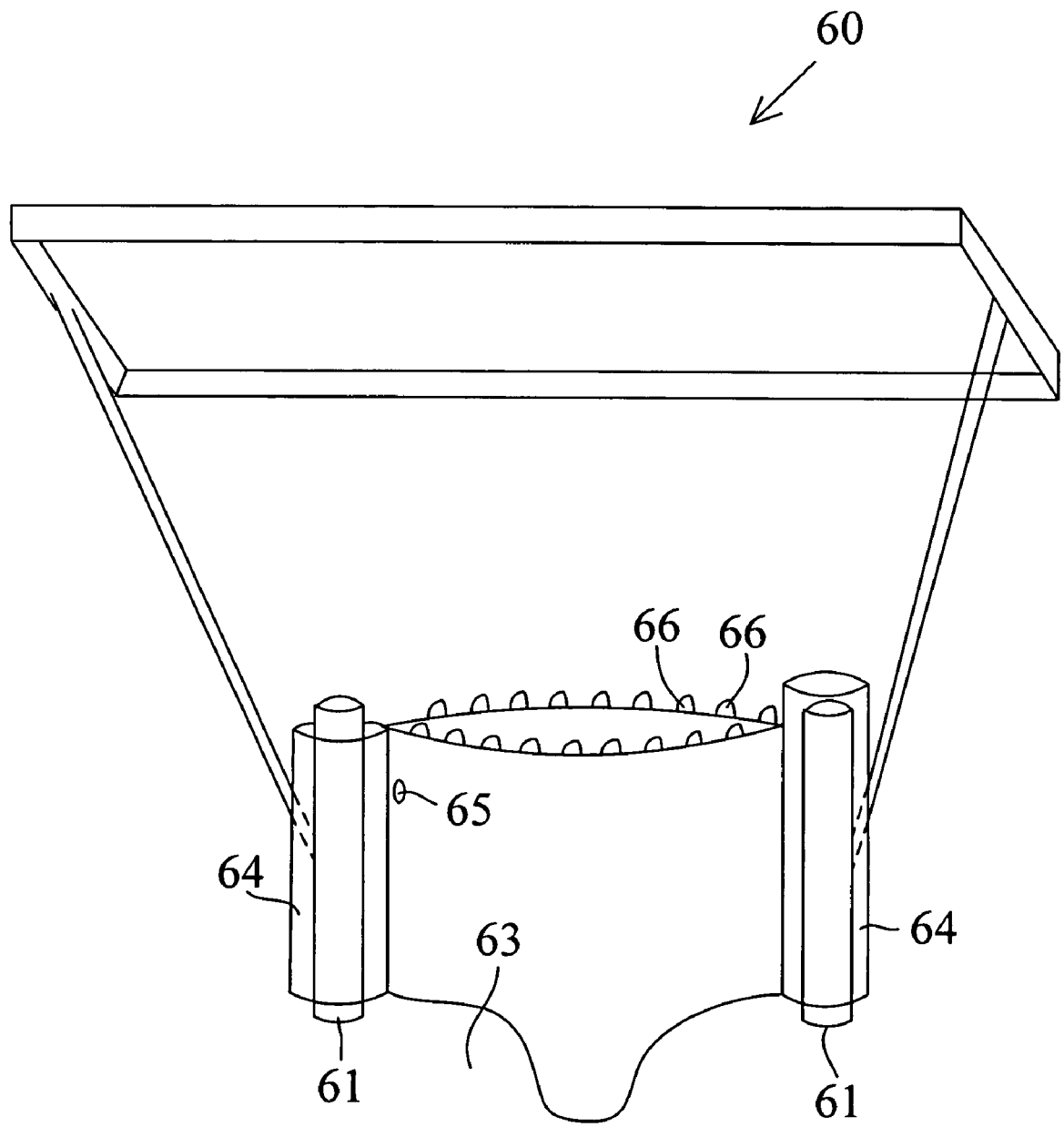
FIG. 15 depicts a side view of a raised plastic rod platform with a plastic toilet bowl, in accordance with the inventive disclosures herein.

FIG. 15 depicts a side view of a raised plastic rod platform with a plastic toilet bowl, in accordance with the inventive disclosures herein.

Figure 16:
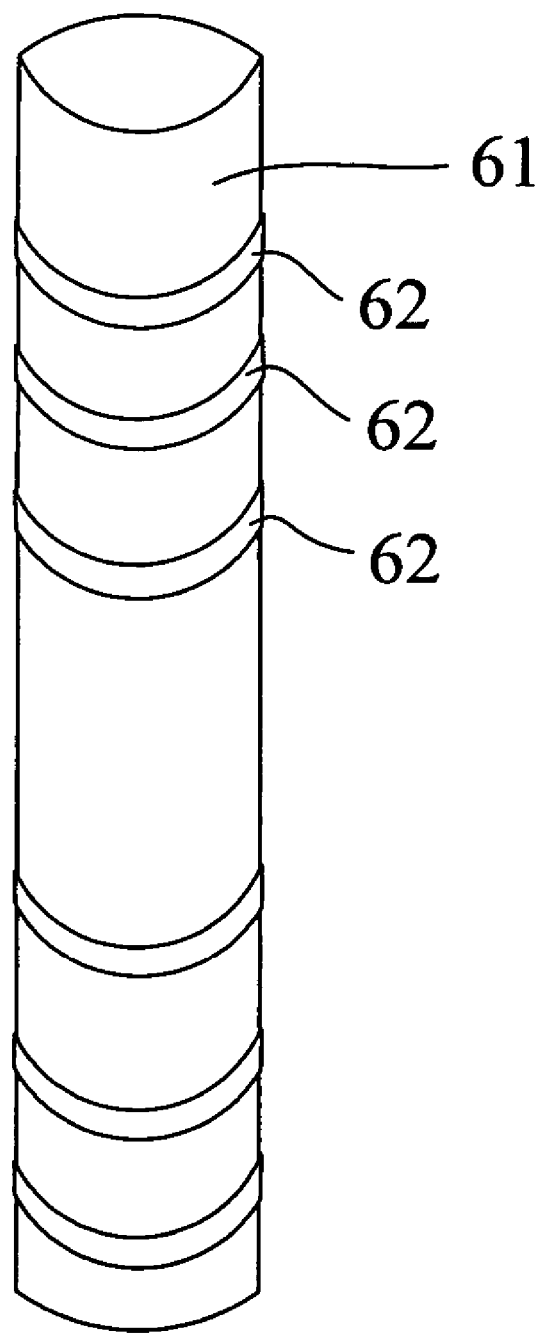
FIG. 16 depicts a side view of one of the support rods of FIG. 15 illustrating the raised rings about portions of the length of the rod, in accordance with the inventive disclosures herein.

FIG. 16 depicts a side view of one of the support rods of FIG. 15 illustrating the raised rings about portions of the length of the rod, in accordance with the inventive disclosures herein. The raised plastic rod platform 60 has two spaced substantially parallel plastic toilet bowl support rods 61, each rod 61 (FIG. 16) having plurality of raised rings 62 along the outer surface of the rod 61. The platform 60 secured to the underside of the seat pan frame member (not shown). A plastic toilet bowl 63 has a hole for receiving a closure string from a two layer plastic disposable base therethrough. The plastic toilet bowl 63 has a plurality of protruding rounded arc members 66 extending upwards from and secured to a top ring of the bowl 63. The arc members for engaging with the ring members of a two layer plastic waste bag as discussed above.

Figure 17:
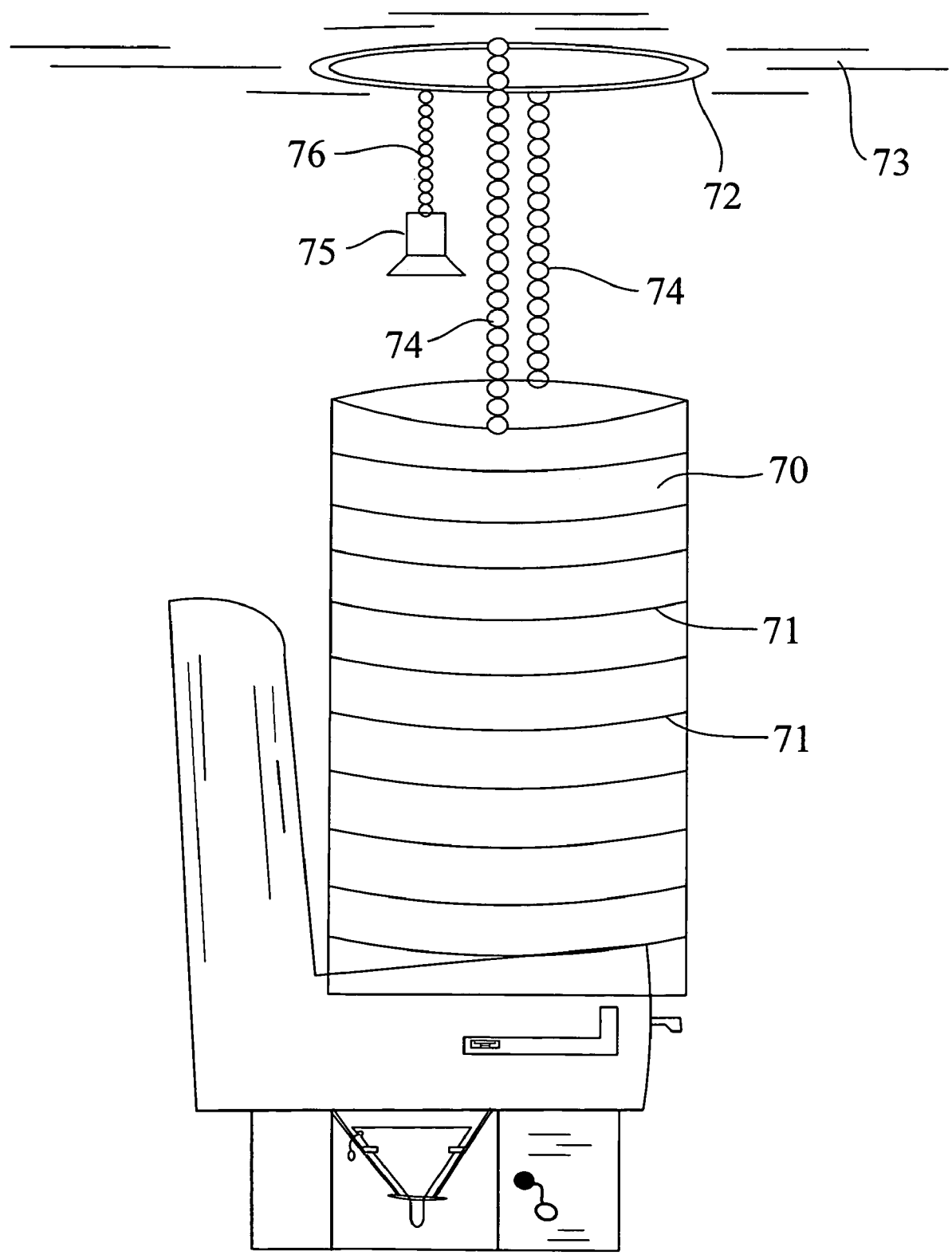
FIG. 17 depicts a perspective view of a vehicle seat equipped with a toilet and deployed and extended duct type privacy shade, in accordance with the inventive disclosures herein.

FIG. 17 depicts a perspective view of a vehicle seat equipped with a toilet and deployed and extended collapsible duct type privacy shade, in accordance with the inventive disclosures herein. A collapsible extensible thin walled flexible plastic duct 70 has metallic rings 71 spaced at intervals along its length, the rings holding the thin walled plastic shade material to the desired shape. The plurality of metallic rings 71 are collapsible against each other to collapse for storage. The duct shade is sized to be extensible downwards around and conceal the person seated on the toilet equipped vehicle seat from view. A zippered shade storage pouch 72 is built into an interior roof lining of the vehicle, the pouch configured to store the collapsible extensible duct shade into the roof liner of the vehicle when the shade is not in use. The shade 70, once deployed from the zippered pouch 72 in the roof liner 73, is held in an elevated position by a plurality of support chains 74 where a first end of each chain secured to vehicle roof and the second end of each chain is secured to a top portion of the collapsible extensible duct shade 70. A flashlight 75 is stored in a zippered pouch in the roof liner 73 and when deployed is supported by a thin metallic chain 76 such as a bracelet chain from the roof of the vehicle.

Figure 18:
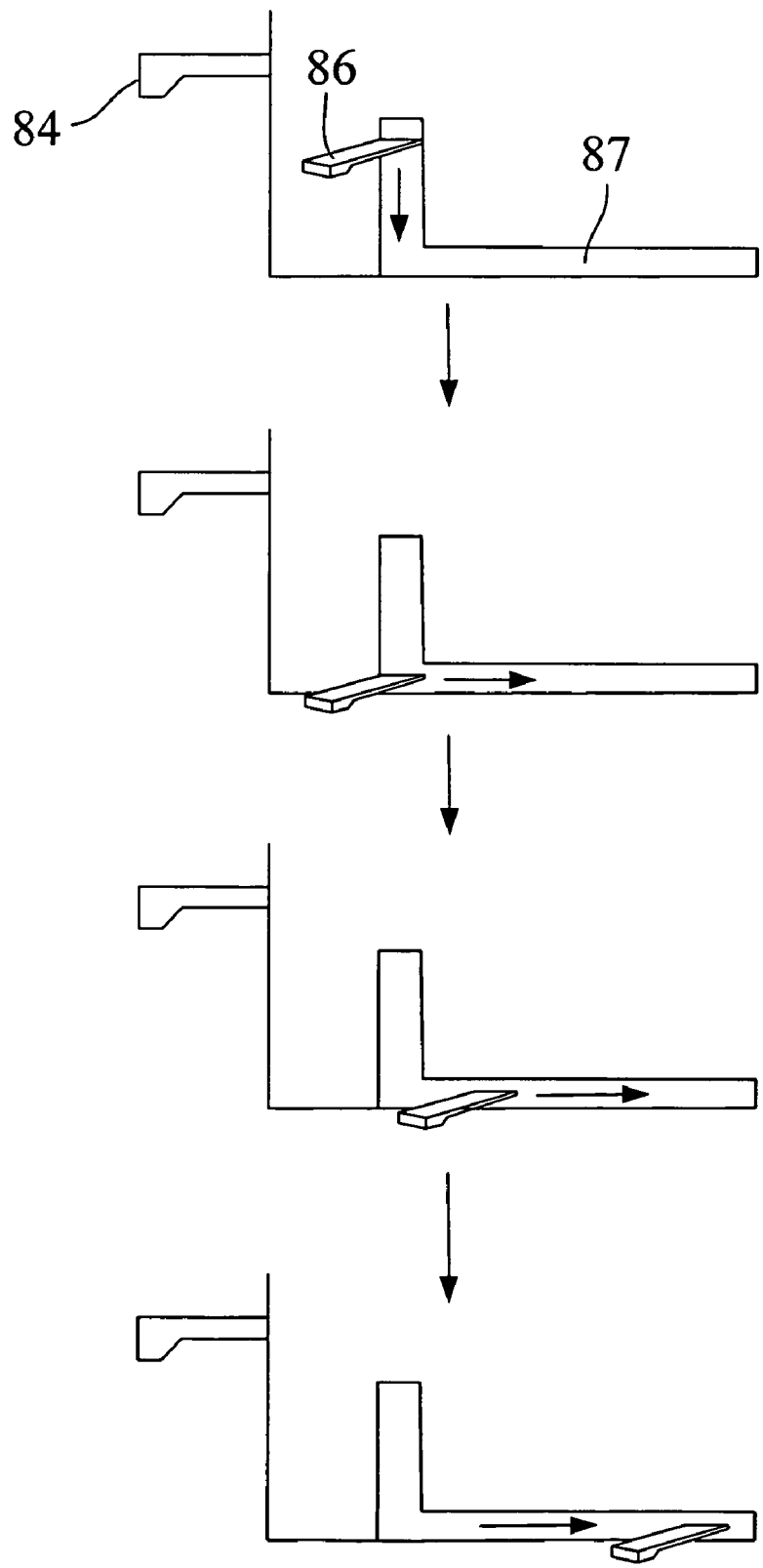
FIG. 18 depicts the track followed by the second lever of the emergency toilet that is integrated with the vehicle seat, in accordance with the inventive disclosures herein.

FIG. 18 depicts the track followed by lever 2 of the emergency toilet that is integrated with the vehicle seat, in accordance with the inventive disclosures herein.

Figure 19:
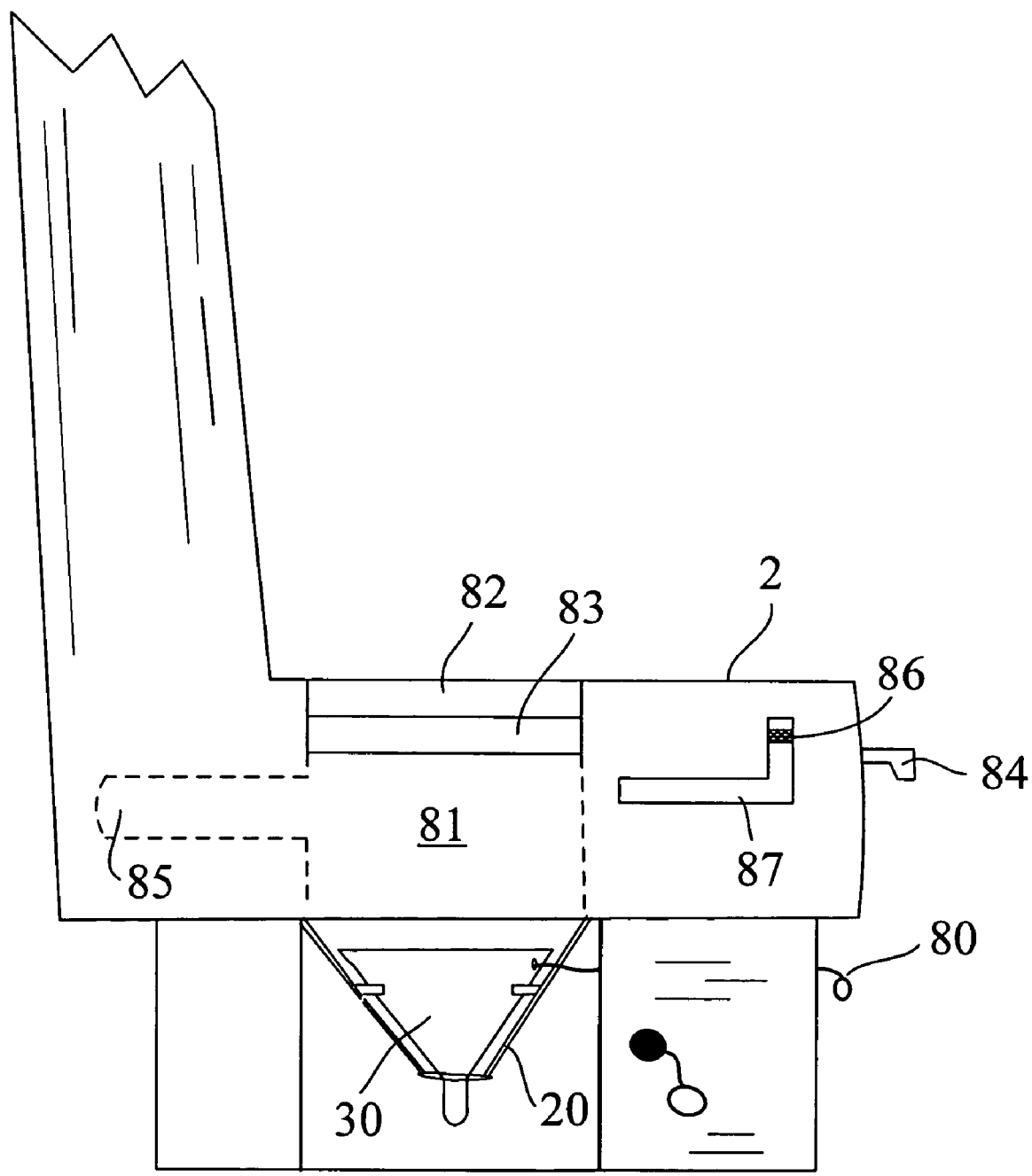
FIG. 19 depicts a side view of a vehicle seat equipped with a built in toilet in accordance with the inventive disclosures herein, illustrating the toilet opening closure in a closed position.

FIG. 19 depicts a side view of a vehicle seat equipped with a built in toilet in accordance with the inventive disclosures herein, illustrating the toilet opening closure in a closed position.

Figure 20:
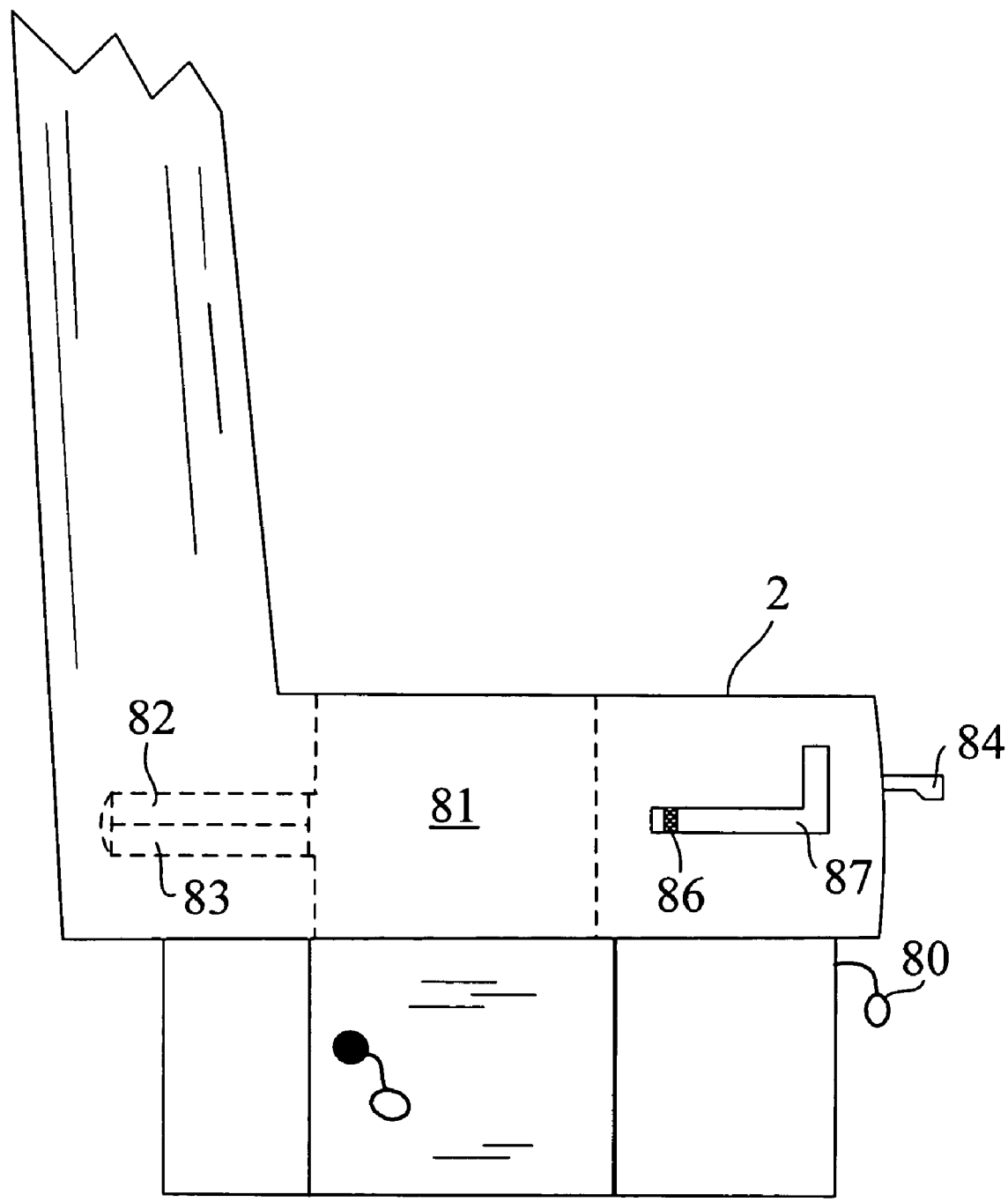
FIG. 20 depicts a side view of a vehicle seat equipped with a built in toilet in accordance with the inventive disclosures herein, illustrating the toilet opening closure in an open position.

FIG. 20 depicts a side view of a vehicle seat equipped with a built in toilet in accordance with the inventive disclosures herein, illustrating the toilet opening closure in an open position. The vehicle seat is equipped with a toilet including a metallic waste receiving bin 30 and a bin holder 20 under the seat pan frame as discussed earlier. The drawstring of the inner layer of the two layer bag routes through the hole in the waste-receiving bin then forward and extending out under the seat pan 2 of the vehicle seat. The seat pan member 2 of the vehicle seat has a closable toilet access opening 81 sized and positioned to serve as a toilet opening, the opening proceeds completely through the seat pan member and opening into the seat pan frame member above the waste receiving bin 30. When the toilet features of the seat are not in use, the toilet access opening 81 is closed by a retractable closure comprising a first layer 82 and a second layer 83. The retractable closure 82, 83 for the toilet access opening is movable within the seat pan member 2 between a first closed position wherein the toilet access opening in the seating portion of the vehicle seat is concealed and a second open position wherein the retractable closure is hidden within the seat pan member and the toilet access opening is fully open between the top surface of the seat pan 2 and the metallic waste bin 30. The retractable closure comprises a first layer 82 comprising seat pan member covering material, the covering material matching the covering material of the seat and a second substantially rigid supportive second layer 83 secured to a bottom surface of the first layer 82. The retractable closure sized to occlude and conceal the toilet access opening when in the first closed position, as illustrated in FIG. 20. To prepare the toilet for use, the retractable closure is released from the first closed position by manipulating the first lever 84. Actuating the first lever 84 releases the retractable closure to drop and prepares it to move into the empty space 85. After the first lever is actuated, the second lever 86 is urged to slide along a track 87 in the side of the vehicle seat to urge the retractable closure 82, 83 into the empty space 85 of the vehicle seat. FIG. 18 progressively illustrates the movement of the second lever in moving the retractable seat closure from the closed position to the open position, where in the open position the closure is stored into empty space within the vehicle seat. The second lever is mechanically connected to the retractable seat closure 82, 83 so that sliding the second lever slides the retractable seat closure. FIG. 20 illustrates the retractable seat closure 82, 83 in its open position with the toilet access opening 81 open through the top of the seat pan 2, and the vehicle toilet is ready for use.

The discussed construction, illustrations and sequence of operation is for one embodiment of the invention but is in no way limiting to other embodiments. The operating modes may be changed and enhanced without deviating from the intention of this inventive disclosure.

In the preceding detailed description, reference has been made to the accompanying drawings that form a part hereof, and in which are shown by way of illustration specific embodiments in which the invention may be practiced. These embodiments and certain variants thereof have been described in sufficient detail to enable those skilled in the art to practice the invention. It is to be understood that other suitable embodiments may be utilized and that logical, material, and mechanical changes may be made without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An emergency disposable toilet system for a seat of a transportation vehicle, the emergency disposable toilet system comprising:
    a non-transparent shade means for providing privacy to a person using the toilet, the shade means extendable from a compacted form to extend between an elevated position to the seating surface substantially concealing the person from view,
    a storage means having the shade means attached thereto, the storage means for storing the shade means in a compacted form until extended for use;
    a means of holding the shade means in a elevated expanded position around the person to conceal the person;
    an vehicle passenger seat incorporating a disposable toilet, the seat comprising:
        a covering material for the seat
        a seat back rest member;
        a seat pan frame member attached to a lower portion of the seat back rest member;
        a seat pan member secured to the seat pan frame, the seat pan member for the person to sit upon, the seat pan member having a toilet access opening sized and positioned to serve as a toilet opening, the opening extending completely through the pan member opening into the seat pan frame member, the seat pan member comprising:
            a retractable closure for the toilet access opening, the closure movable within the seat pan member between a first closed position wherein the toilet access opening is concealed and a second open position wherein the retractable closure is hidden within the seat pan member and the toilet access opening is fully open, the retractable closure comprising:
a first layer comprising seat pan member covering material, the covering material matching the covering material of the seat;
a second substantially rigid supportive layer secured to a bottom surface of the first layer, the retractable closure sized to occlude and conceal the toilet access opening when in the first closed position;
a track means secured to the seat pan frame member, the retractable closure riding the track means between a first closed position and the second open position, the track having an 'L' shaped path;
a first lever moveably secured to a side wall of the seat pan member, the first lever releasing the means of releasably engaging the retractable closure such that the retractable closure is free to drop down a vertical segment of the 'L' path of the track means thereby retracting below a top surface of the seat pan member; and
a second lever slidably secured to side a wall of the seat pan member, the second lever connected to the retractable closure, the second lever for moving the retractable closure between the first and second positions;
a reservoir means for receiving and storing waste materials from the toilet, the reservoir means having a removable closable portion containing the waste so as to facilitate disposal;
a reservoir access door slidably secured to an accessible side wall of the seat pan member, the access door concealing the reservoir, the access door openable to access the reservoir for removing waste; and
a reservoir support frame secured to the seat pan frame member, the reservoir support frame positioned below the toilet access opening, the reservoir means removably secured to the reservoir support frame, wherein the car toilet system is incorporated into one or more seats in the vehicle.

2. The emergency disposable toilet system for a seat of a transportation vehicle of claim 1, wherein:
the storage means comprises:
two elongated arm shade support rods, each rod secured on a first end to a head rest support rod, each rod projecting towards sides of the seat back rest member;
two elongated extension tubes having a bore through a substantial length of the tube, each tube uniquely secured in a substantially vertical alignment to a second end of the arm shade support rods, each extension tube having bore opening at a top end of the extension tube;
two elongated extension rods, each having a lower end uniquely telescopically received in the bore of the extension tubes;
a latching means of fixing the telescopic position of the extension rod in the extension tube;
an elongated first arm having a near end and a far end, the far end having a raised pin secured to a top surface;
an elongated second arm having a near end and a far end;
a means of pivotally securing the near ends of the first and second arms to opposing side surfaces of the seat back rest such that the arms are free to pivot between a lowered position aligned with seat back to a substantially horizontal raised position; and
an elongated third arm having a first end and second end with a hole proximate the second end, the first end pivotally secured to the far end of the first arm, the second end of the third arm configured to detachably engage the raised pin at the far end of the second arm, the third arm pivotable between a storage position aligned with the second arm to an engaging position wherein the third arm spans between the far ends of the first and second arms;
the shade means comprises:
three rolled, thin, flexible, extendable shade, each shade rollably and extensibly secured in each elongated arm, each shade having a length substantially the same as the arm, each shade removable for the arm for replacement, the shades sized to mate along side edges fully concealing the person; and
a shade handle secured to each extendable shade, the shade handle for grasping to extend the shade; and
the means of holding the shade means in an elevated expanded position comprises:
one or more alignable raised ridges with mating indents in facing surfaces of the pivot means between the shade arms and the extension rods, the indents providing increased resistance hold the shade arms in elevated horizontal position.

3. The emergency disposable toilet system for a seat of a transportation vehicle of claim 2, wherein:
the reservoir means comprises:
an inverted pyramid shaped bin holder formed of connected wire rods, pyramid having open sidewalls, the narrow portion of the pyramid truncated in a circular rim, each rod forming the side wall corners of the pyramid having an inwards protruding member secured at a mid portion of its length; the bin holder having one or more clasps for securing the bin holder to the seat pan frame member;
a bowl shaped metallic waste bin having a hole for a closure string, the bin sized and adapted to be received into and supported by the bin holder, the metallic bin comprising:
a plurality of protruding rounded arc members spaced about, extending upwards from and secured to a top ring of the bowl;
a plurality of indents in side of the bowl, the indents sized and positioned to align with and engage with the inwards protruding members of the bin holder; and
a tubular extension having a closed bottom end, the tubular extension secured to bottom of the bowl shaped waste bin, the tubular extension sized and configured to be received through the circular rim of the bin holder; and
the removable closable portion of the reservoir means comprising:
a two layer disposable replaceable plastic waste receiving bag, the bag comprising:
outer layer having:
a plurality of indents in the side of the outer layer, the indents sized and positioned to align with and engage with the inwards protruding members of the bin holder; and
a plurality of ring members secured to an upper edge of the outer layer, the rings sized, configured and positioned to engage onto the protruding rounded arc members of the metallic waste bin; and an inner layer having an upper edge circumferentially equipped with a draw string for closing the top portion of the inner layer, wherein the inner layer provides a closable waste receiving reservoir, wherein the bag is removable for disposal and replaceable.

4. The emergency disposable toilet system for a seat of a transportation vehicle of claim 2, wherein:

the reservoir means comprises:

a raised plastic rod platform, having two spaced substantially parallel plastic toilet bowl support rods, each rod having plurality of rings along the outer surface of the rod, the platform secured to the seat pan frame member; and a plastic toilet bowl having a hole for a closure string, the toilet bowl comprising:

a plurality of protruding rounded arc members spaced about, extending upwards from and secured to a top ring of the bowl; and a tubular extension having a closed bottom end, the tubular extension secured to bottom of the bowl; and the removable closable portion of the reservoir means comprising:

a two layer disposable replaceable plastic waste receiving bag, the bag comprising:

an outer layer having:

a plurality of ring members secured to an upper edge of the outer layer, the rings sized, configured and positioned to engage onto the protruding rounded arc members of the plastic toilet bowl; and an inner layer having an upper edge circumferentially equipped with a draw string for closing the top portion of the inner layer, wherein the inner layer provides a closable waste receiving reservoir, wherein the bag is removable for disposal and replaceable.

5. The emergency disposable toilet system for a seat of a transportation vehicle of claim 1, wherein:

the shade means comprises:

a collapsible extensible thin walled flexible plastic duct have metallic rings spaced at intervals along its length, the rings holding the thin walled plastic in the desired shape, the rings collapsible against each other to collapse the duct for storage, the duct sized to be extensible downwards around and conceal the person from view;

the storage means comprises:

a zippered shade storage pouch built into an interior roof lining of the vehicle, the pouch configured to store the collapsible extensible duct shade; and the means of holding the shade means in a elevated expanded position comprises:

a plurality of support chains, a first end of each chain secured to vehicle roof, the second end of each chain secured to a top portion of the collapsible extensible duct shade.

6. The emergency disposable toilet system for a seat of a transportation vehicle of claim 5, wherein:

the reservoir means comprises:

an inverted pyramid shaped bin holder formed of connected wire rods, pyramid having open sidewalls, the narrow portion of the pyramid truncated in a circular rim, each rod forming the side wall corners of the pyramid having an inwards protruding member secured at a mid portion of its length; the bin holder having one or more clasps for securing the bin holder to the seat pan frame member;

a bowl shaped metallic waste bin having a hole for a closure string, the bin sized and adapted to be received into and supported by the bin holder, the metallic bin comprising:

a plurality of protruding rounded arc members spaced about, extending upwards from and secured to a top ring of the bowl;

a plurality of indents in side of the bowl, the indents sized and positioned to align with and engage with the inwards protruding members of the bin holder; and a tubular extension having a closed bottom end, the tubular extension secured to bottom of the bowl shaped waste bin, the tubular extension sized and configured to be received through the circular rim of the bin holder; and the removable closable portion of the reservoir means comprising:

a two layer disposable replaceable plastic waste receiving bag, the bag comprising:

outer layer having:

a plurality of indents in the side of the outer layer, the indents sized and positioned to align with and engage with the inwards protruding members of the bin holder; and a plurality of ring members secured to an upper edge of the outer layer, the rings sized, configured and positioned to engage onto the protruding rounded arc members of the metallic waste bin; and an inner layer having an upper edge circumferentially equipped with a draw string for closing the top portion of the inner layer, wherein the inner layer provides a closable waste receiving reservoir, wherein the bag is removable for disposal and replaceable.

7. The emergency disposable toilet system for a seat of a transportation vehicle of claim 5, wherein:

the reservoir means comprises:

a raised plastic rod platform, having two spaced substantially parallel plastic toilet bowl support rods, each rod having plurality of rings along the outer surface of the rod, the platform secured to the seat pan frame member; and a plastic toilet bowl having a hole for a closure string, the toilet bowl comprising:

a plurality of protruding rounded arc members spaced about, extending upwards from and secured to a top ring of the bowl; and a tubular extension having a closed bottom end, the tubular extension secured to bottom of the bowl; and the removable closable portion of the reservoir means comprising:

a two layer disposable replaceable plastic waste receiving bag, the bag comprising:

an outer layer having:

a plurality of ring members secured to an upper edge of the outer layer, the rings sized, configured and positioned to engage onto the protruding rounded arc members of the plastic toilet bowl; and an inner layer having an upper edge circumferentially equipped with a draw string for closing the top portion of the inner layer, wherein the inner layer provides a closable waste receiving reservoir, wherein the bag is removable for disposal and replaceable.

8. The emergency disposable toilet system for a seat of a transportation vehicle of claim 1, wherein:
the storage means comprises:
an elongated first arm having a near end and a far end, the far end having a raised pin secured to a top surface;
an elongated second arm having a near end and a far end;
a means of pivotally securing the near ends of the first and second arms to side surfaces of the seat back rest such that the arms are free to pivot between a lowered position aligned with seat back to a substantially horizontal raised position; and
an elongated third arm having a first end and second end with a hole proximate the second end, the first end pivotally secured to the far end of the first arm, the second end of the third arm configured to detachably engage the raised pin at the far end of the second arm, the third arm pivotable between a storage position aligned with the second arm to an engaging position wherein the third arm spans between the far ends of the first and second arms;
the shade means comprises:
three rolled, thin, flexible, extendable shade, each shade rollably and extensibly secured in each elongated arm, each shade having a length substantially the same as the arm, each shade removable for the arm for replacement, the shades sized to mate along side edges fully concealing the person; and
a shade handle secured to each extendable shade, the shade handle for grasping to extend the shade; and
the means of holding the shade means in an elevated expanded position comprises:
one or more alignable raised ridges with mating indents in facing surfaces of the pivot means between the shade arms and the seat back rest, the indents providing increased resistance hold the shade arms in elevated horizontal position.

\* \* \* \* \*